(12) United States Patent
Doke et al.

(10) Patent No.: US 12,461,590 B1
(45) Date of Patent: Nov. 4, 2025

(54) IDENTIFYING INTERACTIONS WITH INVENTORY LOCATIONS

(71) Applicant: Amazon Technologies, Inc., Seattle, WA (US)

(72) Inventors: Abhay Doke, Framingham, MA (US); Gregory Donald Hager, Springfield, VA (US); Harish Srinivasan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 691 days.

(21) Appl. No.: 17/706,168

(22) Filed: Mar. 28, 2022

(51) Int. Cl.
| | | |
|---|---|---|
| *G06F 3/01* | (2006.01) | |
| *G06Q 30/0201* | (2023.01) | |
| *G06T 7/70* | (2017.01) | |
| *G06V 10/25* | (2022.01) | |
| *G06V 10/74* | (2022.01) | |

(Continued)

(52) U.S. Cl.
CPC ......... *G06F 3/013* (2013.01); *G06Q 30/0201* (2013.01); *G06T 7/70* (2017.01); *G06V 10/25* (2022.01); *G06V 10/761* (2022.01); *G06V 20/50* (2022.01); *G06V 20/52* (2022.01); *G06V 20/58* (2022.01)

(58) Field of Classification Search
CPC ......... G06F 3/013; G06F 3/012; G06F 3/005; G06Q 30/0201; G06Q 30/0643; G06Q 30/0631; G06T 7/70; G06V 10/761; G06V 20/50; G06V 40/00–18
See application file for complete search history.

(56) References Cited

U.S. PATENT DOCUMENTS

| | | |
|---|---|---|
| 9,117,106 B2 | 8/2015 | Dedeoglu et al. |
| 9,235,928 B2 | 1/2016 | Medioni et al. |

(Continued)

FOREIGN PATENT DOCUMENTS

JP    2017102564 A  *  6/2017

OTHER PUBLICATIONS

Disclosed Without Attribution, Determining the Location of Items Based on Retrieved Collection, Aug. 17, 2016 (Year: 2016).*

(Continued)

*Primary Examiner* — Andrew W Bee
*Assistant Examiner* — Caleb L Esquino
(74) *Attorney, Agent, or Firm* — Kilpatrick Townsend & Stockton LLP

(57) ABSTRACT

This disclosure describes, in part, techniques for identifying interactions between users and inventory locations. For instance, system(s) may receive image data generated by an imaging device located within a facility. The system(s) may then analyze the image data in order to determine one or more gaze points, where the gaze point(s) indicate location(s) on an inventory location for which a user was looking over a period of time. The system(s) may then generate gaze data indicating period(s) of time that the user was looking at the portion(s) of the inventory location. In some examples, the gaze data represents a heatmap. The system(s) may then use planogram data to determine identifier(s) of item(s) located at the portion(s) of the inventory location. Additionally, the system(s) may generate metrics data representing at least the identifier(s) of the item(s) and the period(s) of time that the user was looking at the item(s).

20 Claims, 14 Drawing Sheets

(51) Int. Cl.
*G06V 20/50* (2022.01)
*G06V 20/52* (2022.01)
*G06V 20/58* (2022.01)

(56) References Cited

U.S. PATENT DOCUMENTS

| | | | | |
|---|---|---|---|---|
| 9,473,747 | B2 * | 10/2016 | Kobres | G06Q 30/00 |
| 10,127,438 | B1 * | 11/2018 | Fisher | G06V 10/82 |
| 10,133,933 | B1 | 11/2018 | Fisher et al. | |
| 2012/0095805 | A1 * | 4/2012 | Ghosh | G06Q 30/0201 |
| | | | | 705/7.29 |
| 2013/0284806 | A1 | 10/2013 | Margalit | |
| 2015/0077325 | A1 * | 3/2015 | Ferens | G06V 40/18 |
| | | | | 345/156 |
| 2016/0110902 | A1 * | 4/2016 | Chirakansakcharoen | |
| | | | | G06F 1/163 |
| | | | | 345/633 |
| 2016/0196575 | A1 * | 7/2016 | Uchida | G06Q 30/0255 |
| | | | | 705/14.45 |
| 2018/0081434 | A1 * | 3/2018 | Siddiqui | G06F 3/013 |
| 2020/0143596 | A1 * | 5/2020 | Lee | G06T 19/20 |
| 2022/0114868 | A1 * | 4/2022 | Bronicki | G06Q 30/0639 |

OTHER PUBLICATIONS

Disclosed Without Attribution, Instrumenting the Real World to Improve Searching and Locating, Sep. 7, 2016 (Year: 2016).*

* cited by examiner

| METRICS 602 | | |
|---|---|---|
| USER IDENTIFIER 604 | INTERACTION TYPE 606 | TIME PERIOD 608 |
| IDENTIFIER 1 | INVENTORY LOCATION 210(1) | FIRST PERIOD OF TIME |
| IDENTIFIER 1 | PORTION 308(1) | SECOND PERIOD OF TIME |
| IDENTIFIER 1 | PORTION 308(2) | THIRD PERIOD OF TIME |
| IDENTIFIER 1 | ITEM 504(8) | FOURTH PERIOD OF TIME |
| IDENTIFIER 1 | ITEM 504(4) | FIFTH PERIOD OF TIME |

FIG. 6

IDENTIFYING INTERACTIONS WITH INVENTORY LOCATIONS

BACKGROUND

When users are online shopping, system(s) are able to identify items that the users are browsing even when the users do not purchase the items and/or add the items to a digital shopping cart. For instance, the system(s) may identify the items based on the users selecting the items for review, placing cursors and/or other input devices over the items, and/or using one or more additional techniques. The system(s) may then perform one or more actions based on these browsing events, such as later providing the users with advertisements for the items. As such, it may be beneficial to also determine items that users are browsing at physical stores even when the users do not purchase the items and/or interact with the items, such removing the items from inventory locations.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example of metrics that represent interactions between a user and an inventory location, in accordance with examples of the present disclosure.

DETAILED DESCRIPTION

Figure 1:
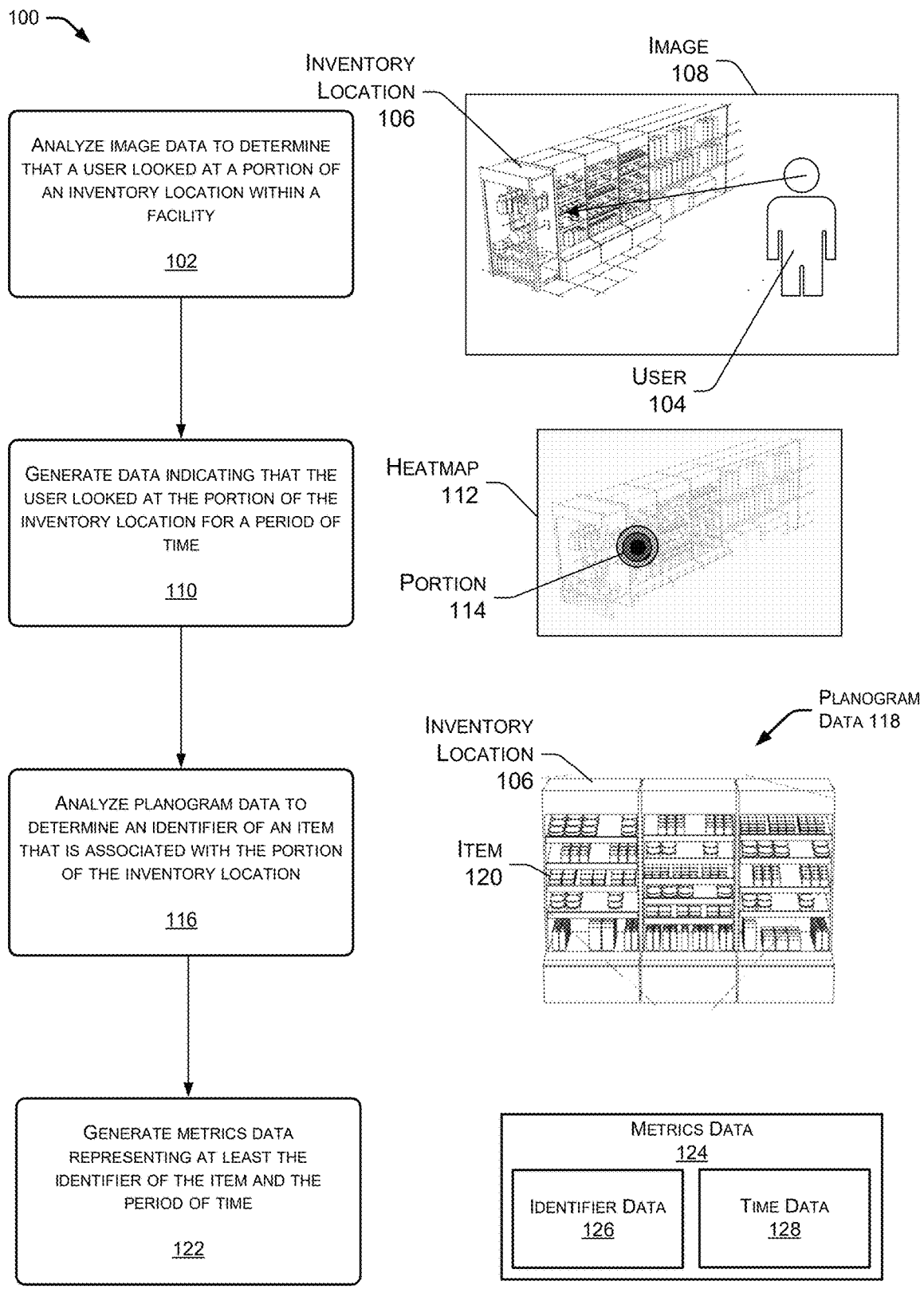
FIG. 1 illustrates an example process for identifying an interaction with an inventory location, in accordance with examples of the present disclosure.

This disclosure describes, in part, techniques for identifying user interactions with inventory locations within a facility. For instance, system(s) (e.g., which may represent, and/or include, the server(s) described herein) may receive image data generated by one or more imaging devices located within the facility. The system(s) may then analyze the image data, using one or more gaze estimation techniques, to determine gaze points indicating portions of an inventory location that a user was looking at during a period of time. Using the gaze points, the system(s) may generate data representing at least periods of time that the user was looking at the different portions of the inventory location. In some examples, the data represents a heatmap indicating the periods of time that the user was looking at the different portions of the inventory location. The system(s) may then use a planogram (and/or other type of data) associated with the facility to determine identifiers of items that are located at the different portions of the inventory location. Additionally, the system(s) may then generate data representing at least the identifiers of the items and the periods of time that the user was looking at the items. If more than one user looked at an item, the data may further represent the total period of time that all of the users looked at the item. This way, the system(s) are able to identify interactions with the inventory location and/or the items located at the inventory location even when the users do not physically interact with the items, such as by removing the items from the inventory location.

For more detail, the system(s) may receive the image data generated by the one or more imaging devices located within the facility. The imaging devices may be located on shopping carts, inventory locations, structures of the facility (e.g., the ceiling, walls, beams, etc.), and/or any other location within the facility. As such, the imaging devices may be stationary, such as when the imaging devices are located on structures within the facility, or the imaging devices may be mobile, such as when the imaging devices are located on shopping carts within the facility. In some examples, the system(s) may also receive additional data with the image data, wherein the additional data represents the locations of the imaging devices within the facility, periods of time that the image data was generated, identifiers associated with users of the imaging devices, and/or the like. For example, if the system(s) receive image data from a shopping cart, the system(s) may also receive additional data representing the location of the shopping cart within the facility, a period of time that the image data was generated, an identifier associated with a user of the shopping cart, and/or any other additional information. The system(s) may then store the image data and/or this additional data in one or more databases.

The system(s) may then analyze the image data to determine that the image data represents at least a user and an inventory location within the facility. As described herein, an inventory location may include, but is not limited to, a shelf, a bin, a table, a freezer, a refrigerator, a rack, and/or any other object within the facility that is capable to holding items. In some examples, the system(s) further analyze the image data to determine that the image data represents a specific portion of the user. For example, the system(s) may analyze the image data to determine that the image data represents the head, the eyes, the pupils, and/or the like of the user. Additionally, in some examples, the system(s) further analyze the image data to determine that the image data represents a threshold area of the inventory location and/or the items that are stored on the inventory location. Based on one or more of these determinations, the systems may then analyze the image data to identify the interactions between the user and the inventor location.

For instance, the system(s) may analyze the image data using one or more gaze estimation techniques, which are described in detail below, in order to determine which portion(s) of the inventory location the user was looking at over a period of time. For one example of performing gaze estimation, the system(s) may analyze the image data and, based on the analysis, determine gaze vectors indicating directions that the user looked over the period of time. The system(s) may then use the gaze vectors to determine gaze points on the inventory location, where the gaze points indicate the focal points of the user on the inventory location over the period of time. In some examples, the system(s) determine a given number of the gaze vectors and/or the gaze points over the period of time. For example, the system(s) may determine a respective gaze vector and/or a respective gaze point for each frame a video that is represented by the image data, for every other frame of the video, for every fifth frame of the video, and/or the like. For another example, the system(s) may determine a respective gaze vector and/or a respective gaze point for each millisecond of the video that is represented by the image data, for each second of the video, for each two seconds of the video, and/or the like.

The system(s) may then use these gaze points to generate data (referred to, in some examples, as "gaze data") indicating portions of the inventory location that the user was looking over the period of time. For example, the gaze data may indicate that the user was looking at a first portion of the inventory location for a first period of time, a second portion of the inventory location for a second period of time, a third portion of the inventory location for a third period of time, and/or so forth. In some examples, the gaze data may represent a heatmap that associates the user with the inventory location. For example, the heatmap may use color-coding to represent the periods of time that the user was looking at the different portions of the inventory location. For instance, and using the example above, a first portion of the heatmap that that is associated with the first portion of the inventory location may include a first color that represents the first period of time, a second portion of the heatmap that is associated with the second portion of the inventory location may include a second color that represents the second period of time, a third portion of the heatmap that is associated with the third portion of the inventory location may include a third color that represents the third period of time, and/or so forth.

In some example, the system(s) may generate the heatmap based on the densities of the gaze points for the different portions of the inventory location. For example, the system(s) may determine that the user looked at portions of the inventory location that include a higher density of gaze points for longer periods of time than portions of the inventory location that include no gaze points. As such, the system(s) may generate the heatmap such that the portions of the heatmap that are associated with a higher density of gaze points include a first color, portions of the heatmap that are associated with no gaze points include a second color, and potions of the heatmap that are associated with densities of gaze points that are between the higher density of gaze points and no gaze points include a range of colors between the first color and the second color. While this is just one example technique for how the system(s) may generate the heatmap, in other examples, the system(s) may use additional and/or alternative techniques for generating the heatmap.

The system(s) may then use the gaze data to identify interactions associated with the user within the facility. As described herein, an interaction may indicate an inventory location that the user looked at while within the facility, a portion of the inventory location that the user looked at while within the facility, an item that the user looked at while within the facility, and/or the like. For a first example, the system(s) may use the gaze data to determine that the user looked at an inventory location for a period of time. For a second example, the system(s) may use the gaze data to determine that the user looked at a portion of the inventory location, such as the top of the inventory location, the bottom of the inventory location, the left side of the inventory location, the right side of the inventory location, the middle of the inventory location, a specific shelf of the inventory location, and/or the like for a period of time. Still, for a third example, the system(s) may use the gaze data to determine that the user looked at an item for a period of time.

In some examples, the system(s) use planogram data associated with the facility to identify the inventory location and/or the items. For example, the system(s) may determine a location (referred to, in some examples, as a "first location") of the imaging device that generated the image data. In some examples, such as when the imaging device is stationary, the system(s) may store and then use data representing the first location of the imaging device within the facility. In some examples, such as when the imaging device is mobile (e.g., part of a shopping cart), the system(s) may receive and then use additional data that represents the first location. In either of the examples, the system(s) use the first location of the imaging device and the image data to determine a location (referred to, in some examples, as a "second location") of the user within the facility. For example, the system(s) may analyze the image data to determine a location (referred to, in some examples, as a "third location") of the user with respect to the imaging device, such as a distance and/or angle of the user with respect to the imaging device, and then use the first location and the third location to determine the second location of the user.

The system(s) may then use the third location of the user and the planogram data to identify the inventory location and/or the items. For example, the planogram data may represent the layout of the facility, such as the locations of the inventory locations, the locations of items on the inventory locations, and/or the like. As such, the system(s) may use the third location of the user to identify the inventory location that the user was looking at (e.g., the inventory location that is represented by the image data) over the period of time. The system(s) may also use the gaze data to determine the portions of the inventory location that the user was looking at over the period of time. The system(s) may then use the portions of the inventory location, along with the planogram data, to identify the items. For example, the system(s) may use the gaze data to determine that the user was looking at a portion of the inventory location for a period of time. The system may then use the planogram data to determine that an item is placed at the portion of the inventory location. As such, the system(s) may determine that the user was looking at the item for the period of time.

In some examples, the system(s) may use additional and/or alternative data to identify the items. For a first example, the system(s) may analyze the image data in order to determine an identifier located on an item for which the user was looking during the period of time. For a second example, the system(s) may analyze the image data in order to determine an identifier placed on the inventory location. The identifier may include fiducial and/or other type of code that the system(s) may use to identify items located at different portions of the inventory location. As such, the system(s) may use the identifier placed on the inventory location in order to identify the item. While these are just a couple extra techniques of how the system(s) may identify the item, in other examples, the system(s) may perform additional and/or alternative techniques.

In some examples, the system(s) use a threshold period of time when identifying the interactions. The threshold period of time may include, but is not limited to, one second, three seconds, five seconds, and/or any other period of time. For example, based on the gaze data indicating that the user looked at a portion of an inventory location for at least the threshold period of time, the system(s) may identify an interaction with the item that is associated with the portion of the inventory location. Additionally, or alternatively, in some examples, the system(s) identify interactions (e.g., impressions) when the user merely glances at the inventory location and/or the portion of the inventory location. For example, if the gaze data indicates that the user merely looked at a portion of the inventory location (e.g., the portion of the inventory location is associated with at least one gaze point), the system(s) may still identify an interaction with the item that is associated with the portion of the inventory location.

In some examples, the system(s) may identify additional interactions associated with the user, which may be referred to as "active interactions" with items. For example, the system(s) may analyze the image data and/or other sensor data and, based on the analysis, determine that the user removed and then held the item for a first period of time. The system(s) may further perform the processes described herein to determine that, while holding the item, the user looked at the item for a second period of time. As such, the system(s) may determine that there was an active interaction with the item, where the active interaction included the user holding the item for the first period of time while looking at the item for the second period of time. This way, even if the user does not acquire the item, such as by placing the item back on the inventory location, the system(s) are still able to identify that an interaction occurred with the item.

The system(s) may then generate data (referred to, in some examples, as "metrics data") representing the interactions associated with the user within the facility. For a first example, the metrics data may represent at least an identifier of an inventory location that the user was looking at and a period of time (which may also be referred to as a "timing indicator") that the user was looking at the inventory location. For a second example, the metrics data may represent at least an identifier of an inventory location, a portion of the inventory location that the was looking at, and a period of time that the user was looking at the portion of the inventory location. Still, for a third example, the metrics data may represent at least an identifier of an item that the user was looking at and a period of time that the user was looking at the item. While these are just a couple examples of metrics data that the system(s) may generate, in other examples, the system(s) may generate additional types of metrics data.

In some examples, the system(s) may generate metrics data that aggregates interactions for more than one user. For example, the system(s) may perform the processes described herein to determine that a first user looked at a portion of an inventory location for a first period of time and a second user looked at the portion of the inventory location for a second period of time. The system(s) may then determine a total period of time that users looked at the portion of the inventory location using at least the first period of time and the second period of time (e.g., by adding the first period of time and the second period of time). Additionally, the system(s) may then generate metrics data that represents the identifier of the inventory location, the portion of the inventory location, an identifier of the item associated with the portion of the inventory location, the total period of time, and/or the like. In other words, the system(s) may be capable of generating metrics data that is specific to a user as well as metrics data that is general for more than one user.

In some examples, the system(s) may receive first image data generated by a first imaging device and second image data generated by a second imaging device, where both the first image data and the second image data represent the same user at a same point of time. In such examples, the system(s) may perform one or more processes to determine that the first image data and the second image data represent the same user at the same point in time. For example, the system(s) may use a first period of time that the first image data generated and a second period of time that the second image data was generated to determine that both the first image data and the second image data were generated during the same time period. The system(s) may then use a first location associated with the first imaging device and a second location associated with the second imaging device to determine that the first image data and the second image data represent a similar portion of the facility (e.g., represent the same inventory location).

The system(s) may further analyze the first image data and the second image data to determine that both the first image data and the second image data represent the same user. In some examples, the system(s) may make the determination by analyzing the first image data and, based on the analysis, determining one or more appearance-based features of the user as represented by the first image data. The system(s) may also analyze the second image data and, based on the analysis, determine one or more second appearance-based features associated with the user as represented by the second image data. The system(s) may then determine that both the first image data and the second image data represent the same user based on the first appearance-based feature (a) matching the second appearance-based feature(s). As described herein, an appearance-based feature may include, but is not limited to, a color of clothing, a type of clothing, a color of accessories, a type of accessories, and/or the like.

The system(s) may then perform one or more techniques to determine which image data to select for performing the processes described herein. For example, the system(s) may analyze the first image data to determine one or more first characteristics, such as a first area of the inventory location that is represented by the first image data, a first portion of the user that is visible, a first angle of the face of the user with respect to the inventory location, a first portion of the user that is occluded, a first portion of the inventory location that is occluded, and/or the like. The system(s) may also analyze the second image data to determine one or more second characteristics, such as a second area of the inventory location that is represented by the second image data, a second portion of the user that is visible, a second angle of the face of the user with respect to the inventory location, a second portion of the user that is occluded, a second portion of the inventory location that is occluded, and/or the like. The system(s) may then use the first characteristic(s) and the second characteristic(s) to select image data.

For a first example, the system(s) may determine to select image data that represents a larger portion of the inventory location. As such, if the first area is larger than the second area, then the system(s) may select the first image data. For a second example, the system(s) may determine to select image data that represents a specific portion of the user, such as the head, the eyes, the pupils, and/or any other portion that helps with gaze estimation. As such, if the first image data represents the eyes of the user while the second image data does not represent the eyes of the user, then the system(s) may again select the first image data. For a third example, the system(s) may determine to select the image data represents an angle of the user looking at the inventory location. As such, if the first image data represents the face of the user and the portion of the inventory location for which the user is looking and the second image data does not represent the face of the user and/or the portion of the inventory location for which the user is looking, then the system(s) may again select the first image data.

In some examples, instead of selecting image data, the system(s) may perform the processes described above to determine a first period of time associated with the first image data and a second period of time associated with the second image data. The system(s) may then determine a final period of time using the first period of time and the second period of time. In some examples, the system(s) may determine the final period of time as an average of the first period of time and the second period of time. In some examples, the system(s) may determine a first confidence associated with the first period of time and a second confidence associated with the second period of time. In such examples, the system(s) may determine the first confidence using the one or more first characteristics and determine the second confidence using the one or more second characteristics. The system(s) may then select the first period of time or the second period of time based on the first confidence and the second confidence. For example, the system(s) may select the first period of time based on the first confidence being greater than the second confidence.

In some examples, the system(s) may then perform one or more actions based on the metrics data. For a first example, and for metrics data that is specific to a user, the system(s) may generate content associated with the items for which the user interacted. As described herein, the content may include, but is not limited to, advertisements, messages, notifications, discounts, coupons, and/or the like. The system(s) may then provide the content to the user. In some examples, the system(s) provide the content by sending the content to a user device (e.g., a mobile phone, a computer, a television, etc.) that is associated with the user. In some examples, the system(s) provide the content using a device that is located within the facility. For example, if the user is located proximate to a display located within the facility, then the system(s) may cause the display to present the content to the user.

For a second example, and for metrics data that is general to more than one user, the system(s) may provide the content to an entity, such as a business, manufacturer, company, producer, and/or any other entity. For instance, if the metrics data represents time periods that users looked at different items associated with the same entity, the system(s) may provide the metrics data to the entity so that the entity is able to determine which items the users spent the most time interacting with within the facility. Still, for a third example, and again for metrics data that is general to more than one user, the system(s) may determine prices for placing items at specific locations within the facility. For instance, if the metrics data indicates that a portion of an inventory location receives many interactions for long periods of time, then the system(s) may determine that a price for placing items at the portion of the inventory location is higher than a price for placing items at other portions of the inventory location.

By performing the processes described herein, the system(s) are able to identify interactions between users and inventory locations and/or items even when the users do not physically interact with the inventory locations and/or the items while within the facility. For example, if though a user does not purchase and item and/or remove the item from the inventory location, the system(s) are still able to determine that the user interacted with the item while at the facility. Additionally, by using imaging devices that are located on shopping carts within the facility, the system(s) are able to receive image data that better represents the users interacting with the inventory locations since the imaging devices are located proximate to the users while the users are within the facility.

As described herein, the system(s) may determine identifiers of users, identifiers of inventory locations, identifiers of items, and/or the like. An identifier may include, but is not limited to, an alphabetic identifier, a numerical identifier, an alphanumeric identifier, and/or any other type of identifier. In some examples, the system(s) may generate the identifier in order to hide the identity of the user. For example, after initially identifying a user within a facility, the system(s) may generate a generic identifier for the user. The system(s) may then use that generic identifier while determining the interactions associated with the user and when generating the metrics data.

Additionally, the processes described herein include analyzing image data to identify a user, identifying interactions associated with the user, and then generating metrics data associated with the interactions. In some examples, before performing any of the processes described herein, the system(s) may receive consent from the user. For example, the system(s) may notify the user about the processes of identifying the user using the image data, analyzing the image data to identify the interactions associated with the user, and then the generating of the metrics data. The system may then only perform one or more of these processes when the user consents to allowing the system(s) to perform the one or more processes.

FIG. 1 illustrates an example process 100 for identifying an interaction with an inventory location, in accordance with examples of the present disclosure. At 102, the process 100 may include analyzing image data to determine a user 104 looked at a portion of an inventory location 106 within a facility. For instance, the system(s) may receive the image data generated by a camera within the facility, where the image data represents one or more images 108. The system(s) may then analyze the image data, using one or more object recognition techniques, in order to determine that the image data represents at least the user 104 and the inventory location 106. As will be described in more detail below, the system(s) may then further analyze the image data, using one or more gaze estimation techniques, in order to determine that the user 104 looked at the portion of the inventory location 106.

At 110, the process 100 may include generating data indicating that the user 104 looked at the portion of the inventory location 106 for a period of time. For instance, the system(s) may generate the data, wherein the data represents an identifier of the inventory location 106, the portion of the inventory location 106, an identifier of the user 104, the period of time, and/or any other information about the interaction between the user 104 and the inventory location 106. In some examples, and as illustrated in the example of FIG. 1, the data may represent a heatmap 112 of at least the inventory location 106. In such examples, the heatmap 112 may use color-coding to represent the periods of time that the user 104 was looking at different portions of the inventory location 106. For instance, and as shown, a portion 114 of the heatmap 112 that corresponds to the portion of the inventory location 106 for which the user 104 was looking includes different colors than other portions of the heatmap 112 that represent other portions of the inventory location 106.

At 116, the process 100 may include analyzing planogram data 118 to determine an identity of an item that is associated with the portion of the inventory location 106. For instance, the system(s) may identify the planogram data 118 that is associated with the inventory location 106 and/or the facility. In some examples, the system(s) identify the planogram data 118 based on a location of the user 104 and/or a location of the imaging device. As described herein, the planogram data 118 may represent the layout of the facility, such as the locations of the inventory locations, the locations of items on the inventory locations, and/or the like. The system(s) may then use the planogram data 118 to determine an identifier of an item 120 that is located at the portion of the inventory location 106.

At 122, the process 100 may include generating metrics data representing at least the identifier of the item and the period of time. For instance, the system(s) generate the metrics data 124 associated with the user 104 for the inventory location 106. As shown, the metrics data 124 may include at least identifier data 126 representing an identifier of the inventory location 106, an identifier of the item 120, and/or an identifier associated with the user 104. The metrics data 124 may further include time data 128 representing the period of time that the user 104 was looking at the item 120. In some examples, the system(s) may then perform one or more actions using the metrics data 124. For a first example, the system(s) may use the metric data 124 to provide content to the user 104, such as in the form of advertisements. For a second example, such as if the metrics data 124 is aggregated with additional metrics data associated with other users, the system(s) may send the metrics data 124 to an entity associated with the item.

Figure 2:
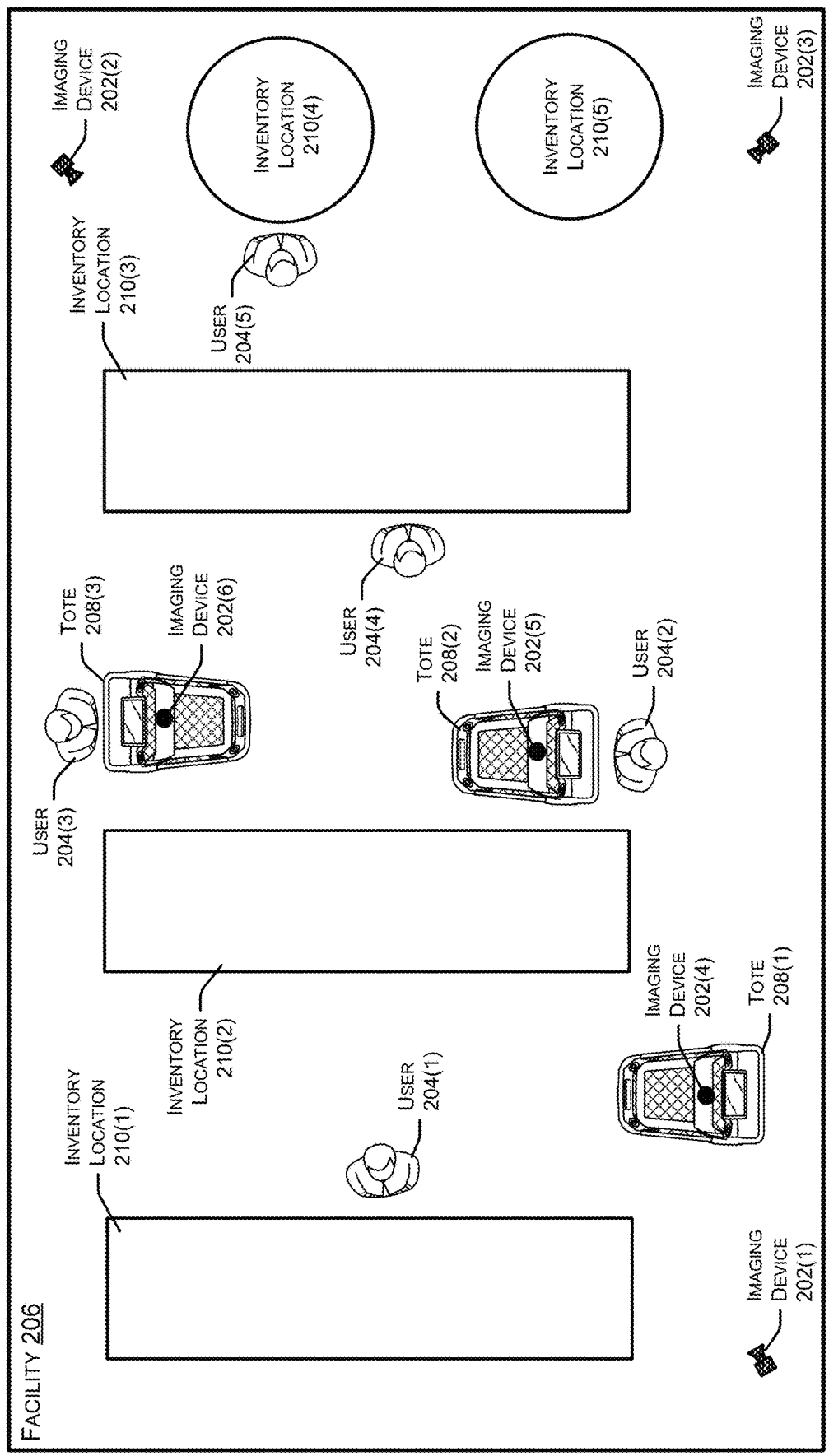
FIG. 2 illustrates an example of imaging devices generating image data representing users within a facility, in accordance with examples of the present disclosure.

FIG. 2 illustrates an example of imaging devices 202(1)-(6) (also referred to as "imaging devices 202") generating image data representing users 204(1)-(5) (also referred to as "users 204") within a facility 206, in accordance with examples of the present disclosure. As shown, the imaging devise 202 may be located at various locations within the facility 206, where some of the imaging devices 202 are stationary while other imaging devices 202 are mobile. For example, the imaging devices 202(1)-(3) may be attached to portions of the facility 206 such that the imaging devices 202(1)-(3) remain stationary. As such, the system(s) may store data representing the locations of the imaging devices 202(1)-(3). Additionally, the imaging devices 202(4)-(6) may respectively be attached to totes 208(1)-(3) (also referred to as "totes 208"), such as shopping carts. As such, the locations of the imaging devices 202(4)-(6) may change as the users 204 are utilizing the totes 208 within the facility 206. Because of this, the system(s) may receive data representing the locations of the totes 208 and use the locations to determine the locations of the imaging devices 202(4)-(6) within the facility 206.

In some examples, one or more of the imaging devices 202 may include an omnidirectional camera with one or more of wide angle lens(es) and/or fisheye lens(es). For example, a first lens may be directed in a first direction creating a first field-of-view (FOV) that is at least 180 degrees and a second lens may be directed in a second direction creating a second FOV that is at least 180 degrees, where the first direction is opposite to the second direction. While this example only describes using two lenses that each create a FOV of at least 180 degrees, in other examples, the imaging device 202 may include any number of lenses that together create the omnidirectional camera. As such, the imaging device 202 may be configured to generate image data representing a view that surrounds an entirety of the imaging device 202. For example, if the imaging device 202 is located on a tote 208, then the imaging device 202 is able to generate image data representing an entirety of the area surrounding the tote 208.

In some examples, the system(s) may respectively associate the totes 208(1)-(3) with the users 204(1)-(3) and use the associations to identify the users 204(1)-(3) when represented by image data. For example, and for the user 204(1), an electronic device attached to the tote 208(1) may receive information associated with the account of the user 204(1). The information may include, but is not limited to, an identifier, a password, payment information, a code (e.g., a Quick Response (QR) code, etc.), and/or any other type of information that the system(s) may use to identify the account. In some examples, the electronic device receives the information from a user device in possession of the user 204(1). Additionally, or alternatively, in some examples, the user 204(1) inputs the information into the electronic device. In either of the examples, the electronic device may then send the account identification data representing the information to the system(s). Using the account identification data, the system(s) may identify the account of the user 204(1) and associate the account with the tote 208(1).

Based on this association, the system(s) may then determine that image data generated by the imaging device 202(4) likely represents the user 204(1). In some examples, the system(s) still perform one or more imaging processing techniques in order to confirm that the image data represents the user 204(1). For example, the imaging device 202(4) may generate initial image data representing the user 204(1) using the tote 208(1), such as pushing the tote 208(1) through the facility 206. The system(s) may then use that initial image data to later determine that additional image data also represents the user 204(1). For example, when receiving additional image data, the system(s) may compare the initial image data to the additional image data and, based on the comparison, determine that both the initial image data and the additional image data represent the same user. As such, the system(s) may determine that the additional image data also represents the user 204(1).

In some examples, the imaging devices 202 may generate image data representing users 204 that are not associated with a tote 208. For instance, and in the example of FIG. 2, the imaging devices 202 may generate image data representing one or more of the users 204(4)-(5), where the users 204(4)-(5) are not associated with a tote 208. In such examples, the system(s) may analyze the image data to determine that the users 204(4)-(5) are not associated with a tote 208. In response, the system(s) may associate the users 204(4)-(5) with general identifiers while the users 204(4)-(5) are located within the facility 206. This way, the system(s) are still able to identify the users 204(4)-(5) when represented by additional image data generated by the imaging devices 202.

In the example of FIG. 2, the imaging devices 202 may generate image data representing the users 204 browsing through items located at inventory locations 210(1)-(5) (also referred to as "inventory locations 210") within the facility 206. For example, the imaging device 202(4) may generate image data representing the user 204(1) browsing through items that are located at the inventory location 210(1). The imaging device 202(4) and/or the tote 208(1) may then send the image data to the systems. Additionally, in some examples, the tote 208(1) may send additional data to the system(s), where the additional data represents at least a time period that the image data was generated, a location of the tote 208(1) when generating the image data, and/or any other information. Using the image data and/or this additional data, the system(s) may then perform one or more of the processes described herein in order to identify interactions between the user 204(1) and the items located at the inventory location 210(1).

Figure 3A:
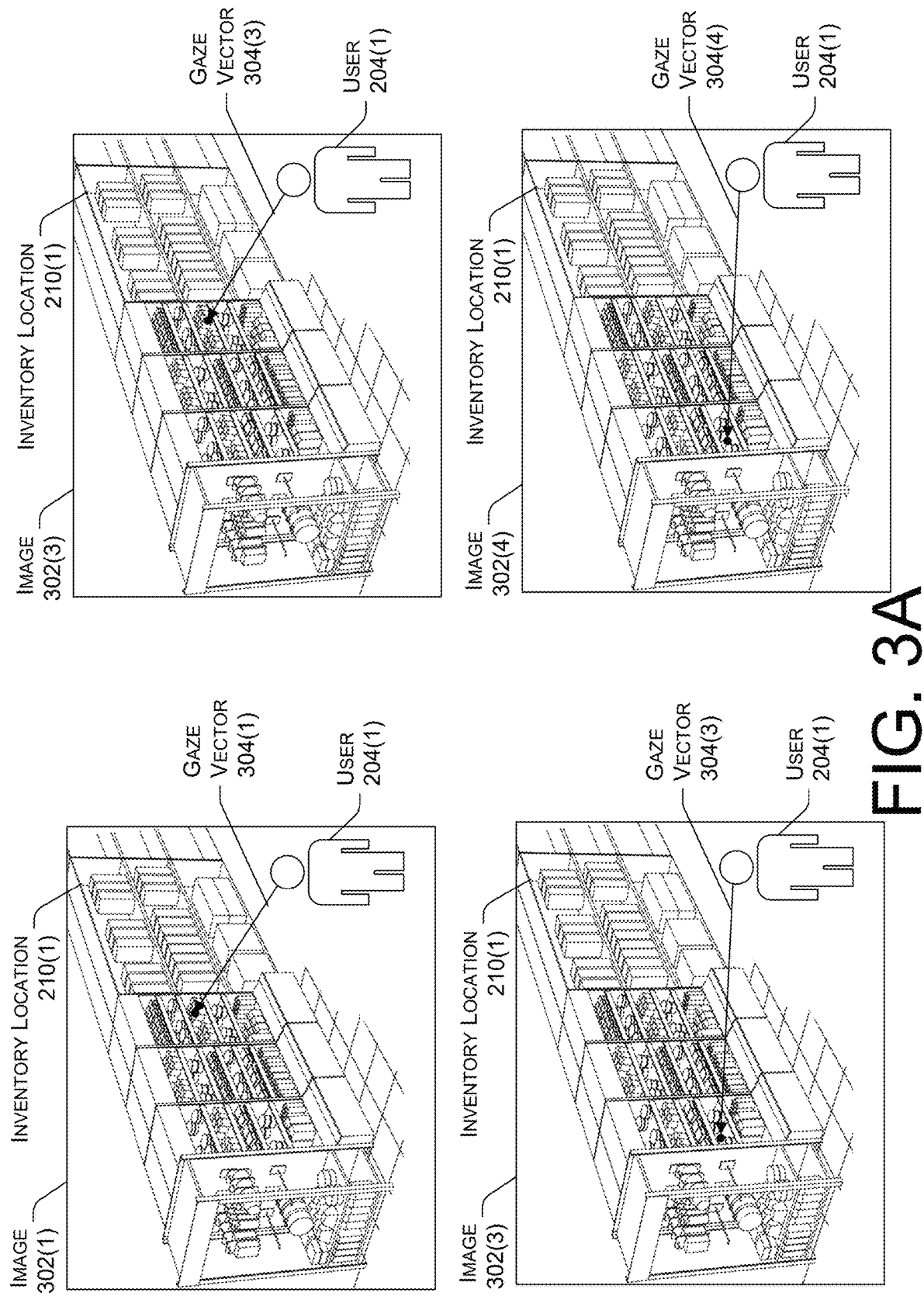
FIGS. 3A-3B illustrate an example of analyzing image data using one or more gaze estimation techniques in order to determine gaze points associated with an inventory location, in accordance with examples of the present disclosure.
Figure 3B:
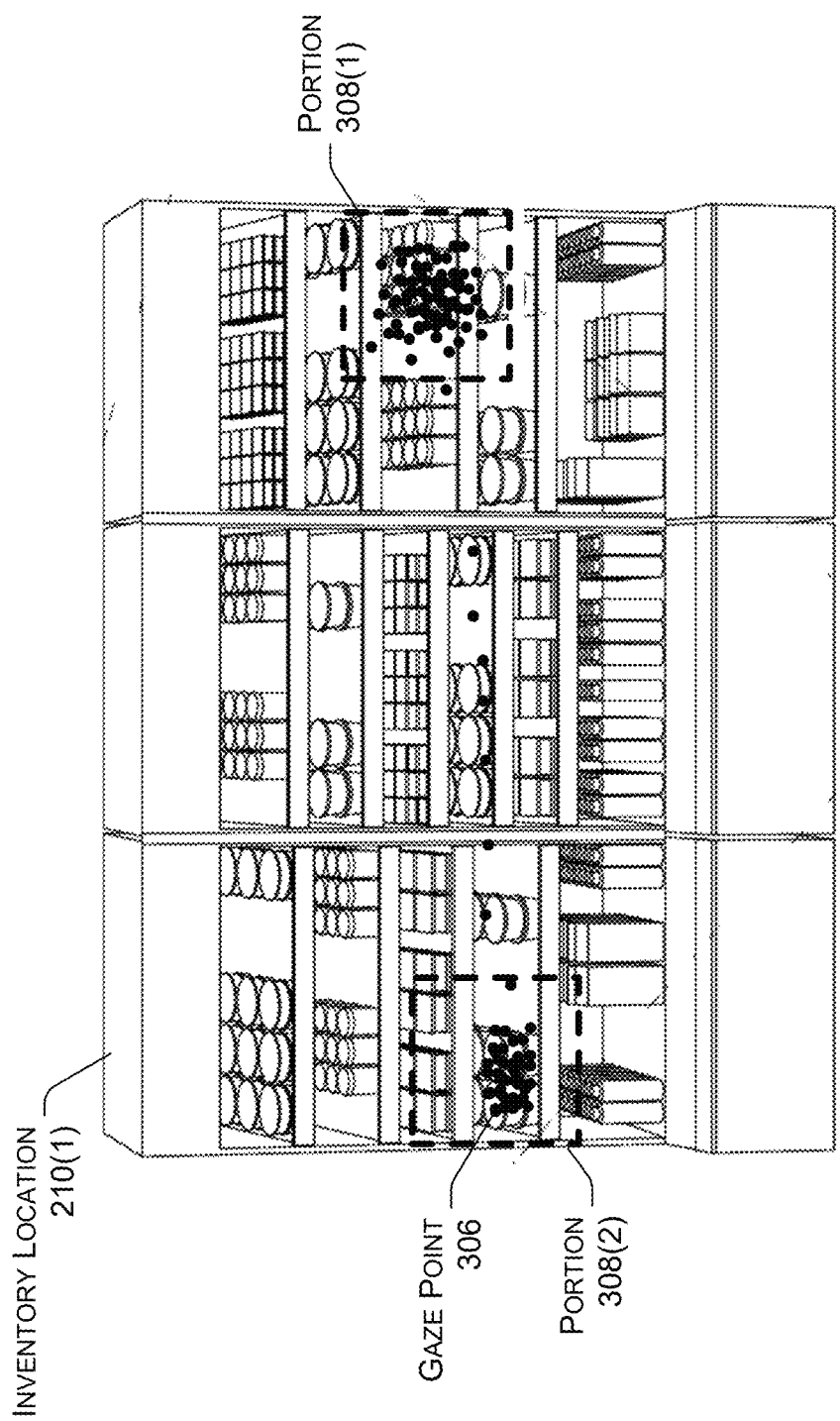

For example, FIGS. 3A-3B illustrate an example of analyzing the image data using one or more gaze estimation techniques in order to determine gaze points associated with the inventory location 210(1), in accordance with examples of the present disclosure. As shown by the example of FIG. 3A, the system(s) may receive, from the imaging device 202(4), the image data that represents images 302(1)-(4) (also referred to as "images 302" and/or "frames 302") of a video. In the example of FIG. 3A, the video depicts the user 204(1) looking at the inventory location 210(1) while shopping within the facility 206. In the example of FIG. 3A, the user 204(1) is looking at different portions of the inventory location 210(1), such as at different items located at the inventory location 210(1). The system(s) may analyze the image data using one or more gaze estimation techniques in order to determine gaze points of the user 204(1) on the inventory location 210(1).

For example, the system(s) may analyze the image data representing the first image 302(1) in order to determine a first gaze vector 304(1) of the user 204(1). In some examples, to determine the first gaze vector 304(1), the system(s) may initially analyze the image data to determine the location of the head, the location(s) of the eye(s), the location(s) of the pupil(s), and/or the like of the user 204(1). The system(s) may then use the location of the head, the location(s) of the eye(s), the location(s) of the pupil(s), and/or the location of the user 204(1) within the first image 302(1) to determine the first gaze vector 304(1). Additionally, the system(s) may then use the gaze vector 304(1) to determine a location for a first gaze point on the inventory location 210(1), wherein the first gaze point is represented by the solid circle at the end of the arrow of the gaze vector 304(1). The system(s) may then perform similar processes in order to determine the gaze vectors 304(2)-(4) and the gaze points for the other images 302(2)-(4) represented by the image data.

While the example of FIG. 3A only illustrates analyzing four images 302 represented by the image data, in other examples, the system(s) may analyze any number of images represented by the image data. For example, and when each image represents a frame of the image data, the system(s) may analyze every frame, every other frame, every fifth frame, and/or any other combination of frames. For another example, the system(s) may analyze a frame every millisecond, every second, every two seconds, and/or any other time period. In either of the examples, and as illustrated in the example of FIG. 3B, the system(s) may determine multiple gaze points associated with the user 204(1) over a period of time.

For instance, and as shown by the example of FIG. 3B, based on analyzing the image data using the gaze estimation technique(s), the system(s) may identify the locations of multiple gaze points 306 located on the inventory location 210(1), although only one is labeled for clarity reasons. As shown, the gaze points 306 indicate that the user 204(1) was initially looking at a first portion 308(1) of the inventory location 210(1) for a first period of time. After the first period of time, the user 204(1) then changed their focus and looked at a second portion 308(2) of the inventory location 210(1) for a second period of time. Additionally, FIG. 3B illustrates that there are a few gaze points 306 located between the first portion 308(1) of the inventory location 210(1) and the second portion 308(2) of the inventory location 210(1). This may be because the user 204(1) had to look across the inventory location 210(1) when switching from looking at the first portion 308(1) to looking at the second portion 308(2). These gaze points 306 may be associated with impressions.

As discussed herein, the system(s) may use one or more gaze estimation techniques when analyzing the image data. For a first example, the system(s) may use one or more gaze estimation techniques that use closeup face images to estimate the gaze of a user by relying mostly on the eyes of the user. For these techniques, the system(s) may need a clear view of the pupil in order to determine the pupil center, the center of the curvature of the cornea, the optical and visual axes, and/or the like. For a second example, the system(s) may use one or more gaze estimation techniques that use cropped images of the head of the user in order to determine the pose of the head which is parameterized by yaw, pitch, and roll. These techniques then use the pose in order to determine the focal point of the user.

For a third example, the system(s) may use one or more gaze estimation techniques that use two distinct processing pathways, where a first pathway (e.g., the saliency pathway) uses a full image and a second pathway (e.g., the gaze pathway) uses the cropped image of the head of the user. Given the image and the location of the head, this approach follows the gaze of the user and identifies the object being looked at by the user. For example, the second pathway, which only has access to the image of the head of the user and the location of the user, predicts the gaze direction which may be used to generate the gaze vector. The first pathway, which has access to the full image, predicts the salient objects (e.g., the inventory locations) that are independent of the user's viewpoint. This is because the first pathway may not know the person from the image to follow and, as such, the first pathway determines the salient objects that are independent of the person's viewpoint. The system(s) then use the outputs from these two pathways in order to determine gaze points on the salient object.

For this third example, the second pathway may output a first spatial map that includes a given size, where the first spatial map indicates the gaze directions of the person. In some examples, a convolutional network (and/or other type of artificial neural network) is used on the cropped image in order to generate the first spatial map. Additionally, the first pathway may output another spatial map that also include the given size, where the second spatial map indicates the salient objects represented by the full image. In some examples, a convolutional network (and/or other type of artificial neural network) is again used on the full image in order to generate the second spatial map. In some examples, the second spatial map may further represent the importance of the salient objects depicted by the full image. These two spatial maps are then combined in order to determine gaze points of the person on one or more of the salient objects. In some examples, the two spatial maps are combined using an element-wise product in order to determine the gaze points.

For a fourth example, and as an extension to the one or more gaze estimation techniques described in the third example, the second pathway may estimate a two-dimensional gaze direction vector instead of producing a directional gaze mask. Using the gaze direction vector, the gaze direction field is calculated which measures the probability of each point being the gaze point. The gaze direction fields are then combined with scene contents by concatenating the original image which infers the gaze point. These gaze estimation technique(s) may eliminate the need for the first pathway.

For a fifth example, a spatiotemporal gaze architecture may be used to determine the gaze points, where the spatiotemporal gaze architecture uses three branches. A first branch, which may include a head conditioning branch, computes a head feature map from a cropped image of the head of the person of interest. The head feature map is then concatenated with a head position feature. Additionally, an attention map is then computed by passing the head feature map and the head position feature through a fully-connected layer. A second branch, which may include a main scene branch, then computes a scene feature map using a "Scene Convolution" part of a network. Input to the "Scene Convolution" is a concatenation of a scene image and a head position image. This scene feature map is then multiplied by the attention map computed by the first branch. Additionally, the head feature map is concatenated to the weighted scene feature map. Furthermore, the concatenated features are encoded using two convolutional layers in an "Encode" module.

A third branch, which may include a recurrent attention prediction module, then integrates temporal information from a sequence of frames using a convolution network. A deconvolutional network comprised of four deconvolution layers then up-samples the features computed by the convolution network into a full-sized feature map. The full-sized feature map is then modulated by a scalar that quantifies whether the person's focus of attention is located inside or outside of the image. This generates a final heatmap that quantifies the location and intensity of the predicted attention target in the image. The final heatmap is then overlayed on the input image in order to output a final visualization.

In one or more of the gaze estimation techniques described above, the gaze estimation technique(s) may be scene aware. This scene awareness is achieved using a saliency pathway of the model architecture and the definition of the saliency is customizable according to the domain in which the system(s) would like to use the gaze estimation technique(s). For instance, and for a grocery store, the items on the shelf may be labelled as the salient points. Additionally, for a clothing store, the clothes displayed on the shelf or hanging on the racks may be labelled as the salient points.

Furthermore, for a warehouse like facility, the shelves and/or racks may be labelled as the salient points. In other words, the system(s) are able to customize the salient points according to the type of facility. This may help increase the accuracy of the system(s) when using gaze estimation to identify interactions between the users and the inventory locations within different types of facilities.

While the examples above describe different gaze estimation techniques that may be used in order to determine the gaze points on an inventory location, in other examples, additional and/or alternative gaze estimation techniques may be used.

Figure 4:
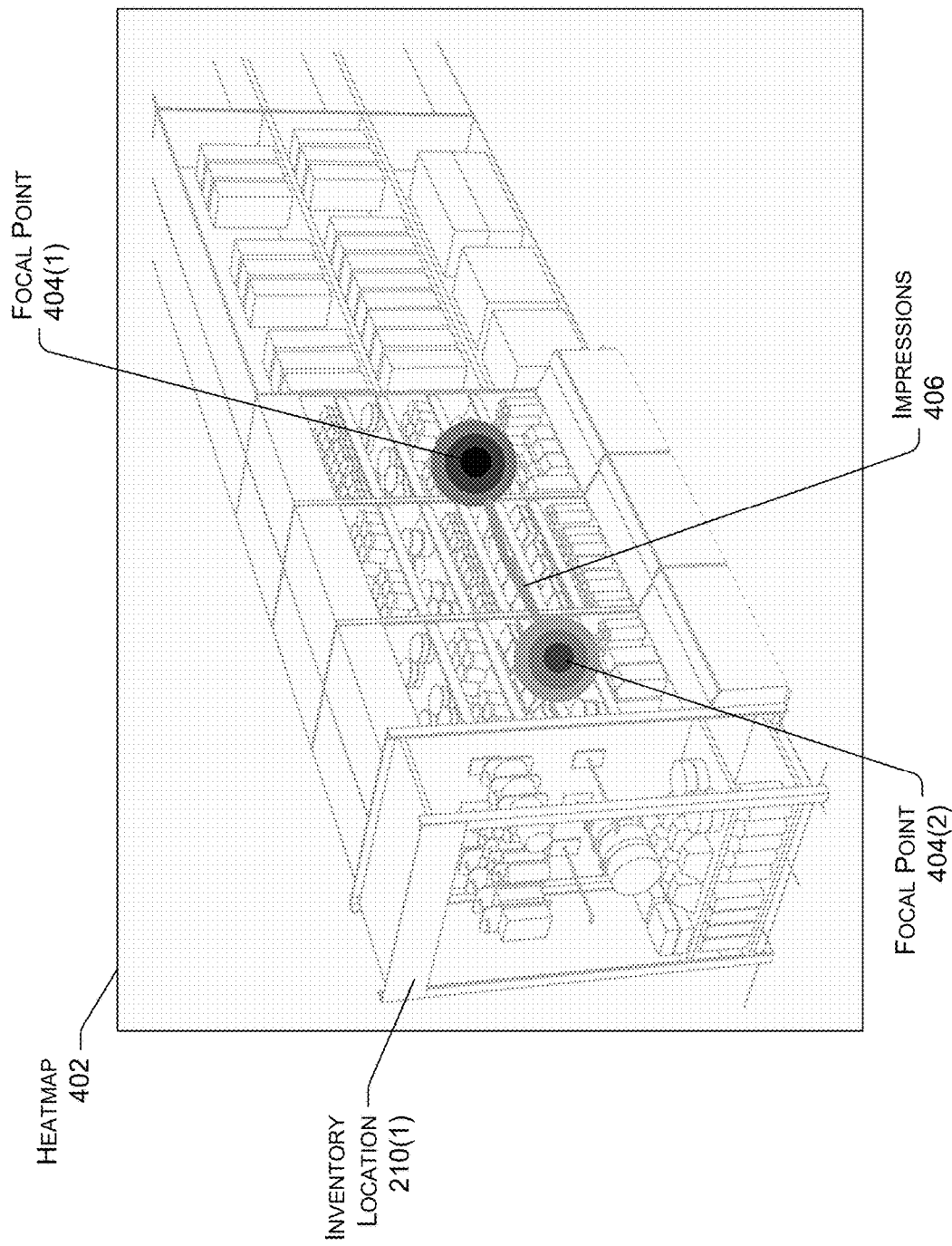
FIG. 4 illustrates an example of a heatmap indicating portions of an inventory location that a user was looking at over a period of time, in accordance with examples of the present disclosure.

As discussed above, after determining the gaze points 306, the system(s) may then use the gaze points 306 to generate gaze data indicating the portions 308(1)-(2) of the inventory location 210(1) that the user 204(1) was looking at during a period of time. As such, FIG. 4 illustrates one example of the gaze data, where the example of FIG. 4 illustrates a heatmap 402 indicating the portions 308(1)-(2) of the inventory location 210(1) that the user 204(1) was looking at over the period of time, in accordance with examples of the present disclosure. As shown, the heatmap 402 includes color-coding to represent the period of time that the user 204(1) was looking at different portions of the inventory location 210(1). For example, a first portion of the heatmap 402 represents a first focal point 404(1) of the user 204(1) that is associated with the first portion 308(1) of the inventory location 210(1). Additionally, a second portion of the heatmap 402 represents a second focal point 404(2) of the user 204(1) that is associated with the second portion 308(2) of the inventory location 210(1). Furthermore, a third portion of the heatmap 402 represents impressions 406 associated with the user 204(1) looking across the inventory location 210(1) from the first portion 308(1) to the second portion 308(2).

In some examples, the system(s) generate the heatmap 402 based on the densities of the gaze points 306 associated with the inventory location 210(1). For instance, and as illustrated by the example of FIG. 4, portions of the heatmap 402 that represents portions of the inventory location 210(1) that include a highest density of gaze points 306 include a first color, which is black in the example of FIG. 4, while portions of the heatmap 402 that represent portions of the inventory location 210(1) that include no gaze points 306 include a second color, which is light grey in the example of FIG. 4. Additionally, portions of the heatmap 402 that include densities of gaze points 306 that are between the highest density of gaze points 306 and no gaze points 306 include colors that range between the first color and the second color. While the example of FIG. 4 illustrates using darker colors for portions of the heatmap 402 that represent portions of the inventory location 210(1) that include higher densities of gaze points 306, in other examples, the system(s) may use any color scheme when generating the heatmap 402. Additionally, in some examples, when generating the heatmap 402, the system(s) may use one or more smoothing algorithms for the color-coding.

By generating the heatmap 402 using the densities of the gaze points 306, the heatmap 402 represents the time periods that the user 204(1) was looking at the different portions of inventory location 210(1). For example, since the portion of the heatmap 402 that is associated with the first focal point 404(1) includes the darkest colors, the heatmap 402 indicates that the user 204(1) spent the longest period of time looking at that the first portion 308(1) of the inventory location 210(1). Additionally, since the portion of the heatmap 402 that is associated with the second focal point 404(2)

includes the second darkest colors, the heatmap 402 indicates that the user 204(1) spent the second longest period of time looking at the second portion 308(2) of the inventory location 210(1). Furthermore, since the portion of the heatmap 402 that is associated with the impressions 406 includes the third darkest color, the heatmap 402 indicates that the user 204(1) spend the third longest period of time looking at those portions of the inventory location 210(1). Finally, since the remaining portions of the heatmap 402 include the second color, the heatmap 402 indicates that the user 204(1) did not spend any time looking at those portions of the inventory location 210(1).

As further discussed above, after generating the gaze data indicating the portions 308(1)-(2) of the inventory location 210(1) that the user 204(1) was looking at during the period of time, the system(s) may then use planogram data to identify the inventory location 210(1), the portions 308(1)-(2) of the inventory location 210(1), and/or the items that the user 204(1) was looking at over the period of time. As such, FIG. 5 illustrates an example of identifying items using planogram data, in accordance with examples of the present disclosure.

As shown, the system(s) may store planogram data 502 indicating the locations of items 504(1)-(10) (also referred to as "items 504") that are stored on the inventory location 210(1) (although only ten items 504 are labeled for clarity reasons). While the example of FIG. 5 illustrates the planogram data 502 as only representing the locations of the items 504 on the inventory location 210(1), in other examples, the planogram data 502 may represent the locations of items on more than one inventory location 210 within the facility 206. In other words, the system(s) may store respective planogram data that represents the locations of items on each inventory location 210 located within the facility 206, planogram data representing the locations of items on more than one inventory location 210 within the facility 206, planogram data representing the locations of items on all of the inventory locations 210 within the facility 206, and/or the like.

Figure 5:
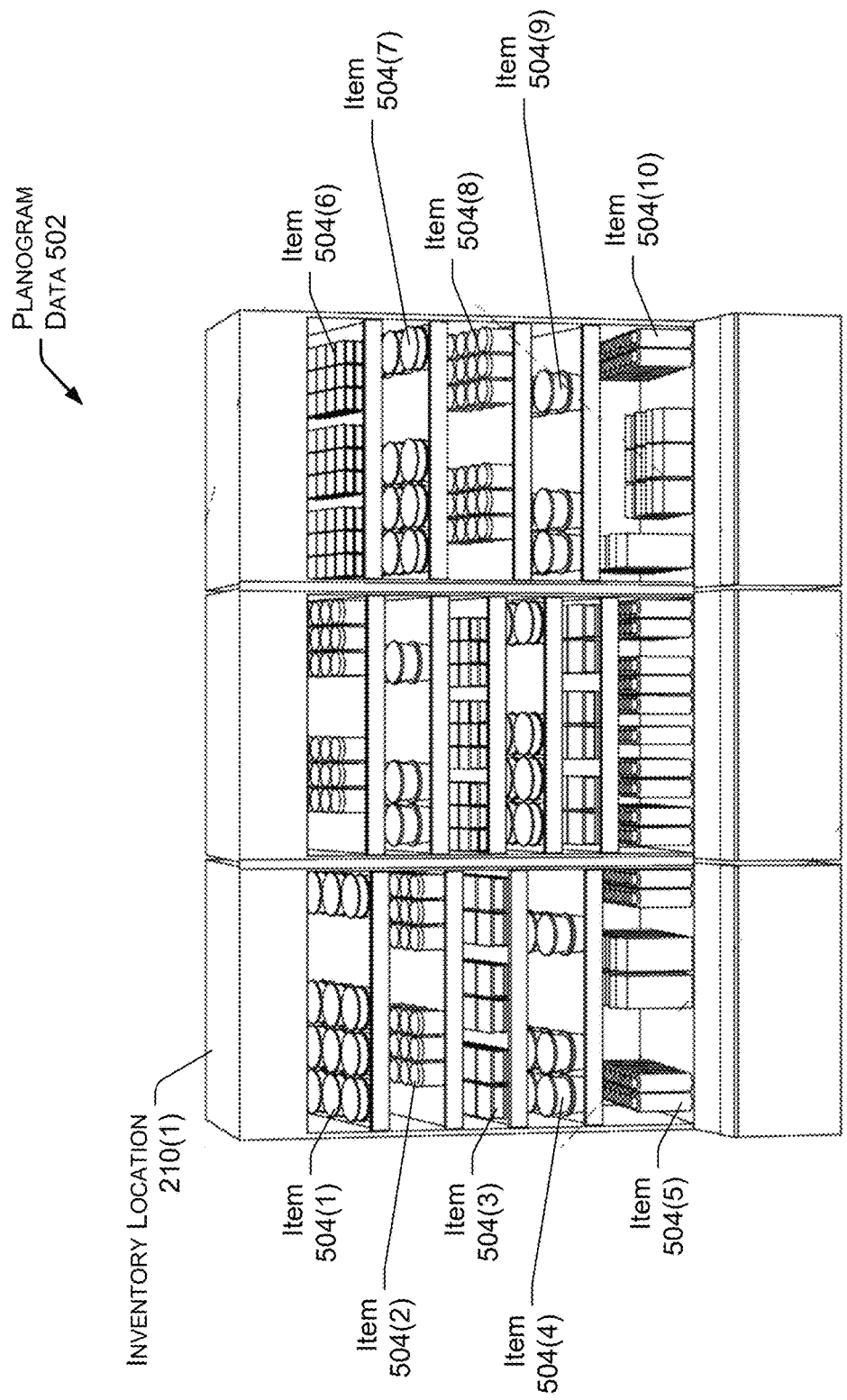
FIG. 5 illustrates an example of identifying items using planogram data, in accordance with examples of the present disclosure.

Additionally, while the example of FIG. 5 illustrates the planogram data 502 as representing a physical layout image of the inventory location 210(1) with the labeled items 504, in other examples, the planogram data 502 may include any structure of data. For example, the planogram data 502 may represent a list, where the list indicates the locations of the inventory locations 210 within the facility 206, the locations of the items on the inventory locations 210, and/or the like. In other words, the planogram data 502 may include any type of data that the system(s) are able to use in order to determine locations the inventory locations 210 and/or the locations of the items within facility 206.

As discussed above, the system(s) may initially identify the inventory location 210(1) for which the user 204(1) was interacting. In some examples, the system(s) identify the inventory location 210(1) using the location of the imaging device 202(4) that generated the image data within the facility 206, the location of the user 204(1) within the facility 206, the planogram data 502, and/or any other information. For example, the system(s) may initially determine the location of the imaging device 202(4). In some examples, the system(s) determine the location of the imaging device 202(4) using data received from the tote 208(1), where the data represents the location of the tote 208(1) (and thus the imaging device 202(4)) within the facility 206. The system(s) may then analyze the image data in order to determine a location of the user 204(1) with respect to the imaging device 202(4). In some examples, the location may include a distance and/or angle with respect to the imaging device 202(4). The system(s) may then use the location of the imaging device 202(4) and the location of the user 204(1) with respect to the imaging device 202(4) to determine the final location of the user 204(1) within the facility 206.

The system(s) may then use the final location of the user 204(1) and the planogram data 502 to identify the inventory location 210(1). For example, the system(s) may use the final location and the gaze direction of the user 204(1) to determine that the user 204(1) is looking at the inventory location 210(1) that is located along the gaze direction of the user 204(1). After identifying the inventory location 210(1), the system(s) may use the planogram data 502 to further identify the portions 308 of the inventory location 210(1) that the user 204(1) was looking at and/or the items that the user 204(1) was looking at on the inventory location 210(1).

For a first example, the system(s) may use the gaze data, which may represent the heatmap 402, to determine that the user 204(1) was looking at the first portion 308(1) of the inventory location 210(1) for a first period of time. The system(s) may then use the planogram data 502 to determine that an item 504 (8) is located at the first portion 308(1) of the inventory location 210(1). As such, the system(s) may determine that the user 204(1) was looking at the item 504 (8) for the first period of time. Additionally, for a second example, the system(s) may use the gaze data, which may again represent the heatmap 402, to determine that the user 204(1) was looking at the second portion 308(2) of the inventory location 210(1) for a second period of time. The system(s) may then use the planogram data 502 to determine that an item 504(4) is located at the second portion 308(2) of the inventory location 210(1). As such, the system(s) may determine that the user 204(1) was looking at the item 504(4) for the second period of time.

Furthermore, and for a third example, the system(s) may use the gaze data, which may again represent the heatmap 402, to determine that the user 204(1) glanced across the inventory location 210(1) between the first portion 308(1) and the second portion 308(2) (which is represented by the impressions 406). The system(s) may then use the planogram data 502 to determine the identities of the items that are located along the path of the impressions 406 (which are again not labeled for clarity reasons). As such, the system(s) may determine that the impressions occurred with those items. After identifying the interactions between the user 204(1) and the inventory location 210(1) over the period of time, the system(s) may then generate metrics representing the interactions.

For example, FIG. 6 illustrates an example of metrics that represent the interactions between the user 204(1) and the inventory location 210(1), in accordance with examples of the present disclosure. As shown, the metrics 602 may include at least a user identifier 604, an interaction type 606, and a time period 608. In the example of FIG. 6, the metrics 602 represents five different interactions. However, in other example, the metrics 602 may represent any number of interactions.

For the first interaction, the metrics 602 indicates that the user identifier 604 associated with the user 204(1) is Identifier 1, the interaction type 606 includes looking at the inventory location 210(1), and the time period 608 is for a first period of time. For the second interaction, the metrics 602 indicates that the user identifier 604 associated with the user 204(1) is again Identifier 1, the interaction type 606 includes looking at the first portion 308(1) of the inventory location 210(1), and the time period 608 is for a second period of time. For the third interaction, the metrics 602 indicates that the user identifier 604 associated with the user 204(1) is again Identifier 1, the interaction type 606 includes looking at the second portion 308(2) of the inventory location 210(1), and the time period 608 is for a third period of time. For the fourth interaction, the metrics 602 indicates that the user identifier 604 associated with the user 204(1) is again Identifier 1, the interaction type 606 includes looking at the item 504 (8), and the time period 608 is for a fourth period of time (which may be the same as the second period of time). Finally, for the fifth interaction, the metrics 602 indicates that the user identifier 604 associated with the user 204(1) is again Identifier 1, the interaction type 606 includes looking at the item 504(4), and the time period 608 is for a fifth period of time (which may be the same as the third period of time).

While the example of FIG. 6 illustrates providing the metrics 602 in a table with rows and columns, in other examples, the system(s) may provide the metrics 602 using any other technique. Additionally, while the example of FIG. 6 illustrates the metrics 602 as being specific to the user 204(1), in other examples, the metrics 602 may be general to more than one user. In such examples, the metrics 602 may not include the user identifier. Additionally, the time periods 608 for each of the interactions may include aggregate periods of time for each of the users that looked at the inventory location 210(1), looked at the portion 308(1) of the inventory location 210(1), looked at the portion 308(2) of the inventory location 210(2), looked at the item 504 (8), and/or looked at the item 504(4).

As discussed above, more than one of the imaging devices 202 located within the facility 206 may generate image data representing the same user 204 during the same time period. For instance, and referring back to FIG. 2, the imaging device 202 (6) may generate first image data representing the user 204(4) browsing the inventory location 210(3) during a same period of time that the imaging device 202 (5) generates second image data representing the user 204(4) browsing the inventory location 210(3). Because of this, the system(s) may select which image data to analyze in order to perform the processes described herein. As such, FIG. 7 illustrates an example of selecting image data for performing the processes described herein when multiple imaging devices 202 generate image data representing the user 204(4), in accordance with examples of the present disclosure.

Figure 7:
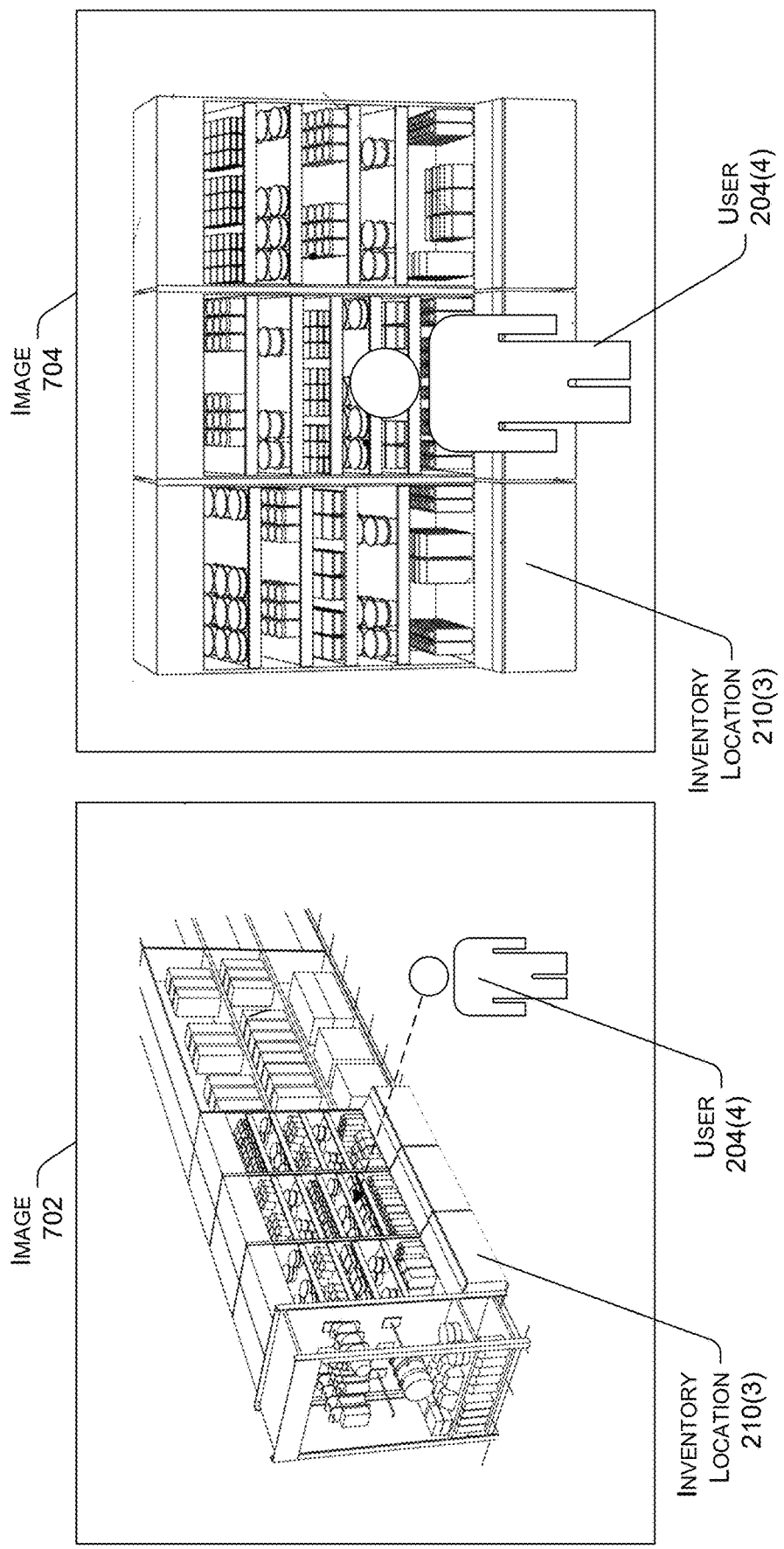
FIG. 7 illustrates an example of selecting image data for gaze estimation processing, in accordance with examples of the present disclosure.

In the example of FIG. 7, the system(s) may receive the first image data generated by the imaging device 202 (6), where the first image data represents at least a first image 702. The system(s) may also receive the second image data generated by the imaging device 202 (5), wherein the second image data represents at least a second image 704. The system(s) may also receive, from the imaging device 202 (6) and/or or an electronic device associated with the tote 208(3), additional data representing at least a first time period that the first image data was generated, a first location and/or a first orientation of the imaging device 202 (6) during the first time period, and/or any other information. Additionally, system(s) may also receive, from the imaging device 202 (5) and/or or an electronic device associated with the tote 208(2), additional data representing at least a second time period that the second image data was generated, a second location and/or a second orientation of the imaging device 202 (5) during the second time period, and/or any other information.

The system(s) may then initially determine that the first image data and the second image data were both generated during the same period of time. For example, the system(s) may determine that the imaging device 202 (6) generated the first image data during the same period of time that the imaging device 202 (5) generated by the second image data. In some examples, the system(s) make the determination by comparing the first time period that the first image data was generated to the second time period that the second image data was generated. Based on the comparison, the system(s) may determine that the first time period at least partly overlaps with the second time period. As such, the system(s) may determine the first image data and the second image data were generated during the same time period.

The system(s) may also determine that the imaging device 202 (6) generated the first image data at a location within the facility 206 that is proximate to where the imaging device 202 (5) generated the second image data. In some examples, to make the determination, the system(s) may analyze the first location that the first imaging device 202 (6) was located at while generating the first image data with respect to the second location that the second imaging device 202 (5) was located at while generating the second image data. Based on the analysis, the system(s) may determine that the first imaging device 202 (6) was located proximate to the second imaging device 202 (5), such as within a threshold distance to the second imaging device 202 (5). The threshold distance may include, but is not limited to, one meter, two meters, five meters, and/or any other distance.

The system(s) may then determine that the first image data and the second image data represent the same user 204(4). In some examples, to make the determination, the system(s) may analyze the first image data to determine one or more first appearance-based features associated with the user 204(4). The system(s) may also analyze the second image data to determine one or more second appearance-based features associated with the user 204(4). Next, the system(s) may analyze the first appearance-based feature(s) with respect to the second appearance-based feature(s) and, based on the analysis, determine that the first image data and the second image data represent the same user 204(4). For example, the system(s) may determine that at least one of the first appearance-based feature(s), such as the color and/or style of a shirt, matches at least one of the second appearance-based features. Based on that determination, the system(s) may determine that the first image data and the second image data represent the same user 204(4).

In response to determining that both the first image data and the second image data represent the same user 204(4), the system(s) may select one of the first image data or the second image data for identifying the interactions between the user 204(4) and the inventory location 210(3). In some examples, to make the selection, the system(s) may analyze the first image data to determine one or more first characteristics, such as a first area of the inventory location 210(3) that is represented by the first image data, a first portion of the user 204(4) that is visible, a first angle of the face of the user 204(4) with respect to the inventory location 210(3), and/or the like. The system(s) may also analyze the second image data to determine one or more second characteristics, such as a second area of the inventory location 210(3) that is represented by the second image data, a second portion of the user 204(4) that is visible, a second angle of the face of the user 204(4) with respect to the inventory location 210(3), and/or the like. The system(s) may then use the first characteristic(s) and the second characteristic(s) to select image data.

For a first example, the system(s) may determine to select the image data that represents a larger portion of the inventory location 210(3). In the example of FIG. 7, the first image data represents an entirety of the face of the inventory location 210(3) for which items are displayed while the second image data represents only a portion the face of the inventory location 210(3) (e.g., the user 204(4) is blocking some of the face of the inventory location 210(3)). As such, the system(s) may select the first image data based on this first criterion. For a second example, the system(s) may determine to select the image data that represents a specific portion of the user, such as the head, the eyes, the pupils, and/or any other portion that helps with gaze detection. In the example of FIG. 7, the first image data may represent at least one eye of the user 204(4) since the first image data represents a side of the user 204(4) while the second image data does not represent at least one eye of the user 204(4) since the second image data represents the back of the user 204(4). As such, the system(s) may again select the first image data based on this second criterion.

For a third example, the system(s) may determine to select the image data that better represents an angle of the user 204(4) looking at the inventory location 210(3). In the example of FIG. 7, the system(s) may determine that the first image data represents a first angle of the user 204(4) with respect to the inventory location 210(3), where the first angle is represented by a gaze vector (e.g., the dashed arrow line). However, the system(s) may determine that the second image data does not represent a second angle of the user 204(4) with respect to the inventory location 210(3) since the user 204(4) is blocking the gaze vector. As such, the system(s) may again select the first image data based on this third criterion.

In some examples, the system(s) may use one of the criteria when selecting the image data while, in other examples, the system(s) may use more than one of the criteria when selecting the image data. Additionally, in some examples, the system(s) may use a ranking for the criteria when selecting the image data. For example, the system(s) may determine that the second criterion is the most important criteria (e.g., ranked first) since the image data needs to represent one or more eyes of the user 204(4) in order to analyze the image data using the gaze estimation technique(s). The system(s) may then determine that the third criterion is the second most important criteria (e.g., ranked second) since the image data needs a good angle of the user 204(4) with respect to the inventory location 210(3) in order to analyze the image data using the gaze estimation technique(s). Finally, the system(s) may determine that the first criterion is the least important criteria (e.g., ranked third) since the area of the inventory location 210(3) is not that important for analyzing the image data using gaze estimation technique(s).

While this example describes the system(s) as selecting image data generated by one imaging device 202 when multiple imaging devices 202 generate image data representing the user 202(4), in other examples, the system(s) may analyze image data generated by more than one imaging device 202. For example, the system(s) may analyze the first image data generated by the imaging device 206 (6) in order to determine a first period of time that the user 204(4) was looking at a portion of the inventory location 210(3). The system(s) may also analyze the second image data generated by the imaging device 202 (5) in order to determine a second period of time that the user 204(4) was looking at the portion of the inventory location 210(3). In some examples, the system(s) may then determine a final period of time that the user 204(4) was looking at the portion of the inventory location 210(3) using the first period of time and the second period of time. For example, the system(s) may determine the final period of time by taking an average of the first period of time and the second period of time.

In some examples, the system(s) may determine a first confidence associated with the first period of time determined using the first image data and a second confidence associated with the second period of time determined using the second image data. In such examples, the system(s) may determine the first confidence using the first characteristic(s) and determine the second confidence using the second characteristic(s). The system(s) may then select the first period of time or the second period of time as the final period of time based on the first confidence or the second confidence. For example, if the first confidence is greater than the second confidence, then the system(s) may select the first period of time to be the final period of time.

While these last two examples describe using image data generated by two imaging devices 206, in other examples, the system(s) may perform similar processes for image data generated by any number of devices 206.

Figure 8:
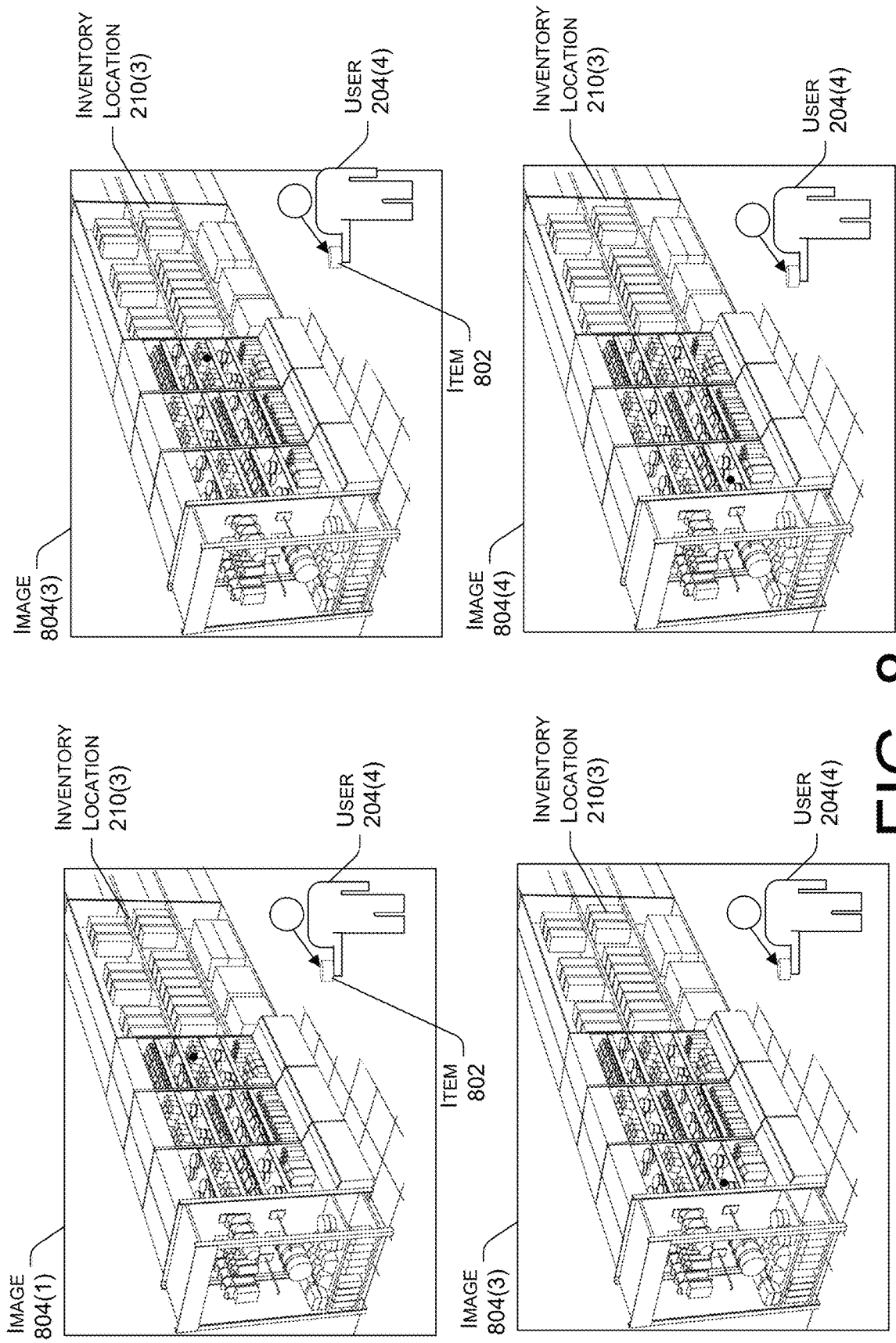
FIG. 8 illustrates example of analyzing image data using one or more gaze estimation techniques in order to determine gaze points associated with an item in possession of a user, in accordance with examples of the present disclosure.

As discussed herein, in some examples, a user 204 may possess an item while looking at the item. As such, FIG. 8 illustrates an example of analyzing image data using one or more gaze estimation techniques in order to determine gaze points associated with an item 802 in possession of the user 204(4), in accordance with examples of the present disclosure. As shown by the example of FIG. 8, the system(s) may receive, from the imaging device 202 (6), the image data that represents images 804(1)-(4) (also referred to as "images 804" and/or "frames 804") of a video. In the example of FIG. 8, the video depicts the user 204(4) in possession of an looking at the item 802 while shopping within the facility 206.

The system(s) may analyze the image data representing the first image 804(1) in order to determine a first gaze vector (e.g., which is represented by the arrow) of the user 204(4). In some examples, to determine the first gaze vector, the system(s) may initially analyze the image data to determine the location of the head, the location(s) of the eye(s), the location(s) of the pupil(s), and/or the like of the user 204(4). The system(s) may then use the location of the head, the location(s) of the eye(s), the location(s) of the pupil(s), and/or the location of the user 204(4) within the first image 804(1) to determine the first gaze vector. Additionally, the system(s) may then use the gaze vector to determine that a location for a first gaze point is on the item 802. The system(s) may then perform similar processes in order to determine the gaze vectors and the gaze points for the other images 804(2)-(4) represented by the image data.

While the example of FIG. 3A only illustrates analyzing four images 804 represented by the image data, in other examples, the system(s) may analyze any number of images represented by the image data. For example, and when each image represents a frame of the image data, the system(s) may analyze every frame, every other frame, every fifth frame, and/or any other combination of frames. For another example, the system(s) may analyze a frame every millisecond, every second, every two seconds, and/or any other time period.

The system(s) may then use the gaze points in order to determine a period of time that the user 204(4) was looking at the item 802 while the user 204(4) was also in possession of the item 802. The system(s) may then store this additional information as metrics data associated the user 204(4).

Figure 9:
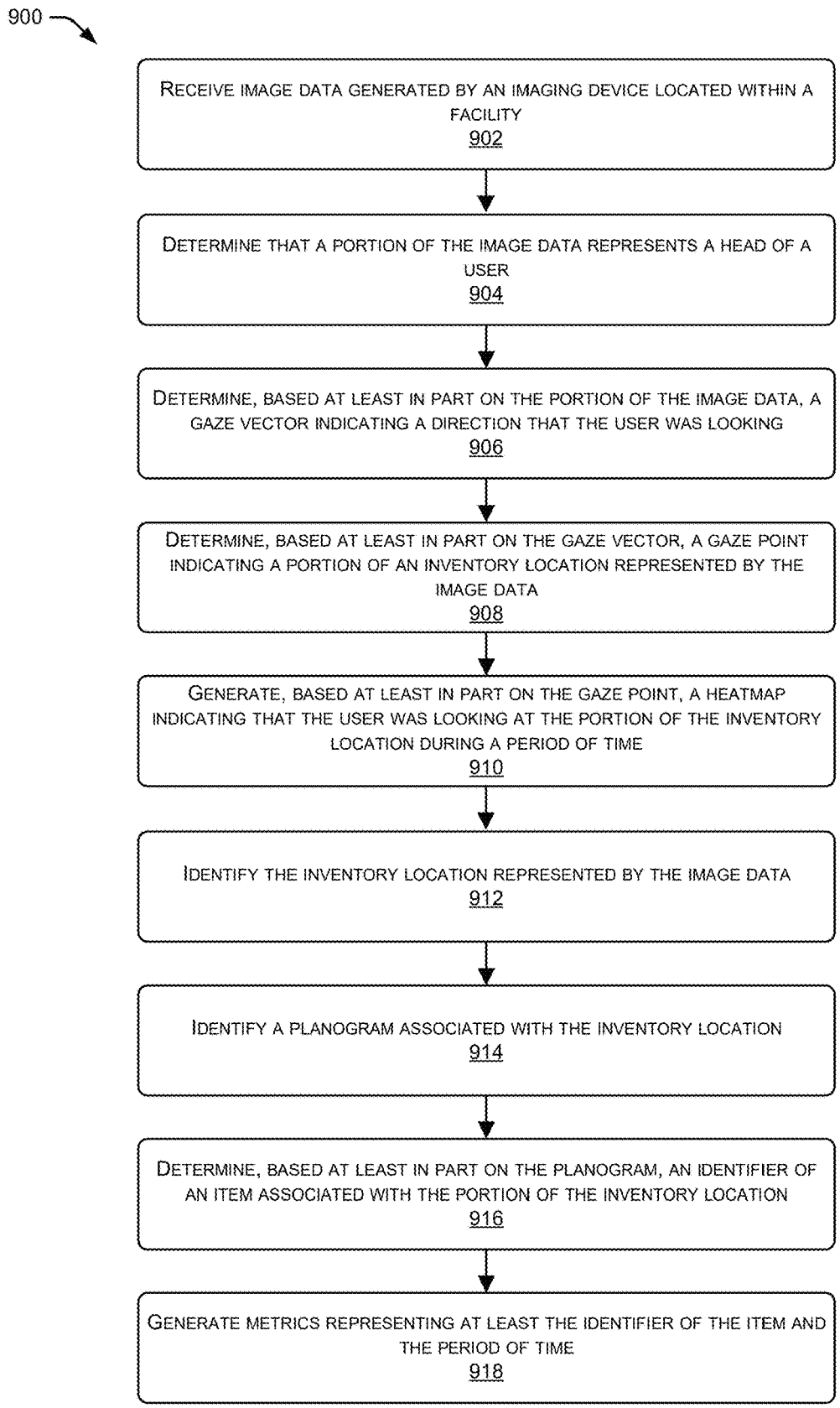
FIG. 9 illustrates an example process for identifying an interaction between a user and an inventory location using a heatmap and a planogram, in accordance with examples of the present disclosure.
Figure 10:
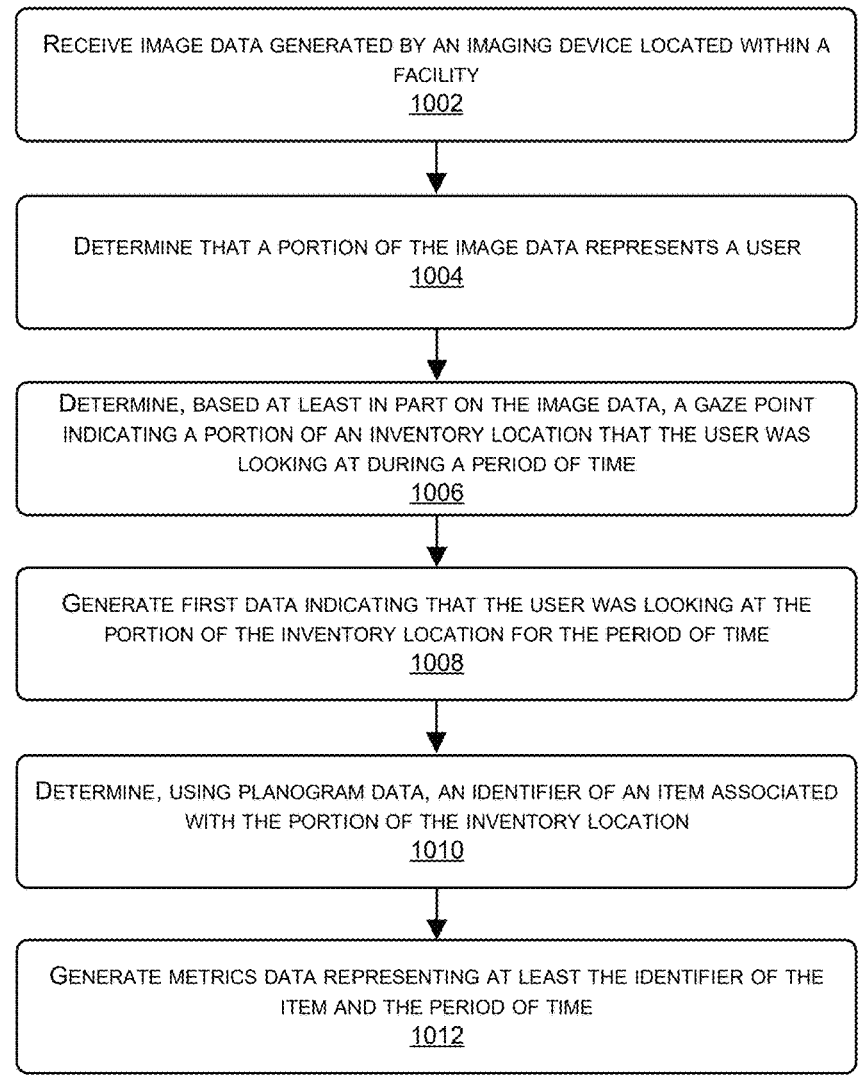
FIG. 10 illustrates an example process for identifying an interaction between a user and an inventory location using gaze estimation, in accordance with examples of the present disclosure.
Figure 11:
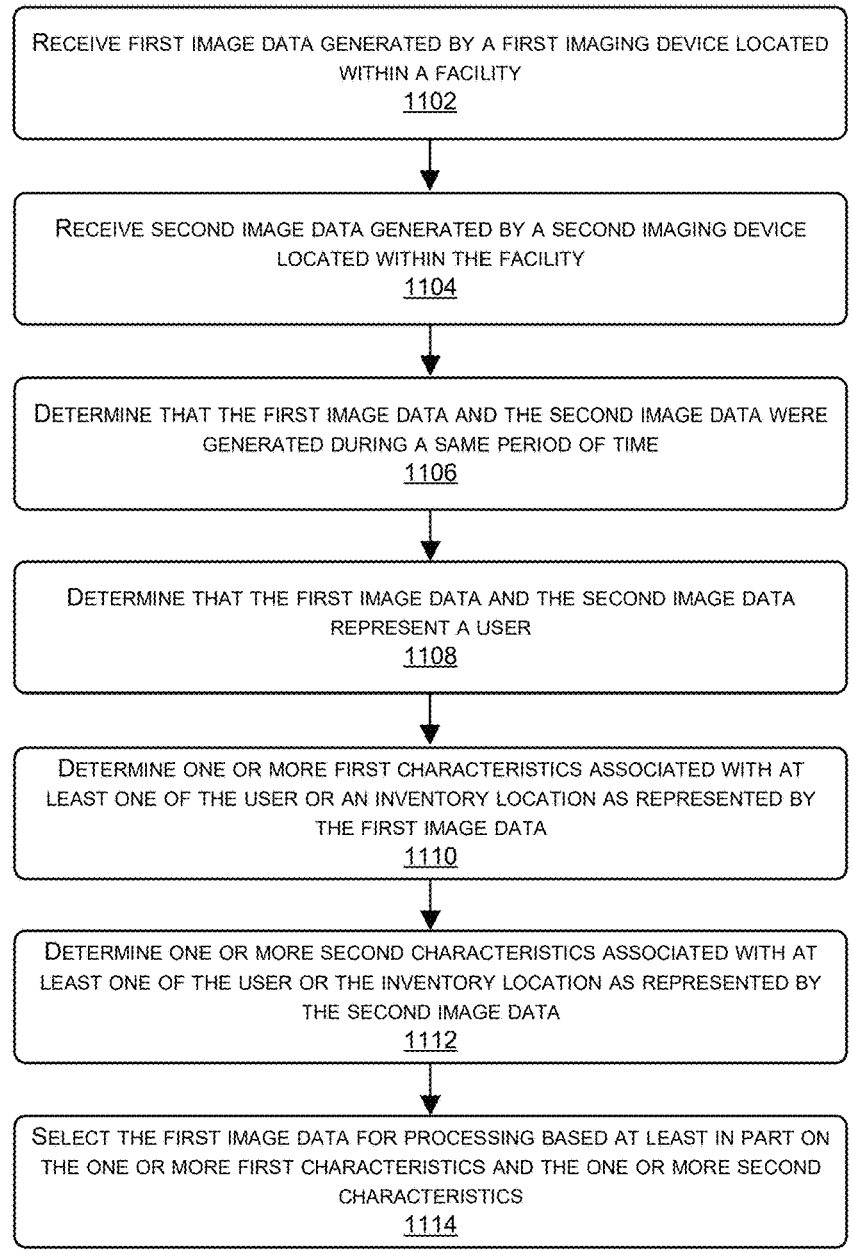
FIG. 11 illustrates an example process for selecting image data for gaze estimation processing, in accordance with examples of the present disclosure.

FIGS. 9-11 illustrate various processes for identifying interactions between users and inventory locations. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 9 illustrates an example process 900 for identifying an interaction between a user and an inventory location using a heatmap and a planogram, in accordance with examples of the present disclosure. At 902, the process 900 may include receiving image data generated by an imaging device located within a facility. For instance, the system(s) may receive the image data generated by the imaging device. In some examples, the system(s) receive the image data directly from the imaging device while, in other examples, the system(s) receive the image data from one or more other computing devices. In some examples, the imaging device includes a stationary imaging device within the facility while, in other examples, the imaging device is mobile within the facility. Still, in some examples, the system(s) receive additional data, such as data representing a location of the imaging device, an orientation of the imaging device, an identifier associated with a user, a period of time that the image data was generated, and/or any other information.

At 904, the process 900 may include determining that a portion of the image data represents a head of a user and at 906, the process 900 may include determining, based at least in part on the portion of the image data, a gaze vector indicating a direction that the user was looking. For instance, the system(s) may analyze the image data, such as using one or more object recognition techniques, to determine that the image data represents a person. As such, the system(s) may further analyze the image data determine that the portion the image data further represents at least the head of the user. The system(s) may then analyze the portion of the image data, using one or more of the gaze estimation techniques described herein, to determine the gaze vector associated with the user.

At 908, the process 900 may include determining, based at least in part on the gaze vector, a gaze point indicating a portion of an inventory location represented by the image data. For instance, the system(s) may further analyze the imaging device, using the one or more gaze estimation techniques, to determine the gaze point on the inventory location using the gaze vector. In some examples, the system(s) perform processes 904-909 for every image represented by the image data, every other image represented by the image data, every fifth image represented by the image data, and/or the like.

At 910, the process 900 may include generating, based at least in part on the gaze point, a heatmap indicating that the user was looking at the portion of the inventory location during a period of time. For instance, the system(s) may use the gaze point to generate the heatmap indicating that the user was looking at the portion of the inventory location for the period of time. In some examples, such as when the system(s) determine multiple gaze points associated with the inventory location, the system(s) may generate the heatmap based on the densities of the gaze points at different portions of the heatmap. As such, the heatmap may indicate the periods of time that the user was looking at the different portions of the heatmap. This is because the user looked at portions of the inventory location that are associated with higher densities for longer periods of time than the user looked at portions of the inventory location with no gaze points and/or lower densities of gaze points.

At 912, the process 900 may include identifying the inventory location represented by the image data and at 914, the process 900 may include identifying a planogram associated with the inventory location. For instance, the system(s) may determine the location of the imaging device and/or the location of the user within the facility. The system(s) may then use the location of the imaging device and/or the location of the user to identify the inventory location for which the user was looking. Additionally, the system(s) may identify the planogram that is associated with the inventory location. In some examples, the planogram may represent the layout of the facility, such as the locations of the inventory locations, the locations of items on the inventory locations, and/or the like. In other examples, the planogram may be specific to the inventory location and just represent the locations of the items on the inventory location.

At 916, the process 900 may include determining, based at least in part on the planogram, an identifier of an item associated with the portion of the inventory location and at 918, the process 900 may include generating metrics representing at least the identifier of the item and the period of time. For instance, the system(s) may analyze the planogram in order to determine the identifier of the item that is associated with the portion of the inventory location. The system(s) may then generate the metrics representing at least the identifier of the item and the period of time. In some examples, such as when the system(s) perform these processes for multiple users, the metrics may indicate a total period of time that the users looked at the portion of the inventory location.

FIG. 10 illustrates an example process 1000 for identifying an interaction between a user and an inventory location using gaze estimation, in accordance with examples of the present disclosure. At 1002, the process 1000 may include receiving image data generated by an imaging device located within a facility. For instance, the system(s) may receive the image data generated by the imaging device. In some examples, the system(s) receive the image data directly from the imaging device while, in other examples, the system(s) receive the image data from one or more other computing devices. In some examples, the imaging device includes a stationary imaging device within the facility while, in other examples, the imaging device is mobile within the facility. Still, in some examples, the system(s) receive additional data, such as data representing a location of the imaging device, an orientation of the imaging device, an identifier associated with a user, a period of time that the image data was generated, and/or any other information.

At 1004, the process 1000 may include determining that a portion of the image data represents a user. For instance, the system(s) may analyze the image data, such as using one or more object recognition techniques, to determine that the portion of the image data represents the user. Additionally, in some examples, the system(s) may further analyze the image data to determine that the portion of the image data represents a portion of the user, such as, but not limited to, the head, the eye(s), the pupil(s), and/or the like of the user.

At 1006, the process 1000 may include determining, based at least in part on the image data, a gaze point indicating a portion of an inventory location that the user was looking at during a period of time. For instance, the system(s) may analyze the image data, using one or more gaze estimation techniques, in order to determine the gaze point. In some examples, analyzing the image data may include determining a gaze vector indicating a direction that the user was looking during the period of time and then using the gaze vector to determine the gaze point associated with the inventory location. In some examples, such as when the image data represents multiple images depicting the user, the system(s) may perform similar processes in order to determine numerous gaze points associated with the inventory location. In other words, the system(s) may use the image data to estimate where the user was looking on the inventory location over the period of time.

At 1008, the process 1000 may include generating first data indicating that the user was looking at the portion of the inventory location for the period of time. For instance, the system(s) may use the gaze point in order to generate the first data indicating that the user was looking at the portion of the inventory location for the period of time. In some examples, the first data may represent a heatmap indicating the portion of the inventory location and the period of time. In some examples, the system(s) may generate the first data to indicate multiple periods of time that the user was looking at different portions of the inventory location over a total period of time that the user was interacting with the inventory location.

At 1010, the process 1000 may include determining, using the first data, an identifier of an item associated with the portion of the inventory location. For instance, the system(s) may initially identify the inventory location that is represented by the image data and for which the user was interacting. The system(s) may then identify planogram data associated with at least the inventory location, where the planogram data represents the locations of items on the inventory location. Using the planogram data, the system(s) may then determine the identifier of the items that is associated with the portion of the inventory location. In some examples, such as if the user was looking at multiple portions of the inventory location over the total period of time, the system(s) may use the planogram data to determine the identifiers of each of the items associated with the multiple portions of the inventory location.

At 1012, the process 1000 may include generating metrics data representing at least the identifier of the item and the period of time. For instance, the system(s) may then generate the metrics data representing at least the identifier of the item and the period of time. In some examples, such as when the user was looking at multiple portions of the inventory location, the system(s) may generate the metrics data to represent each of the identifiers of the items that the user was looking at as well as each of the periods of time for which the user was looking at the items. In some examples, such as when the system(s) perform these processes for multiple users, the metrics data may indicate a total period of time that the users looked at the portion of the inventory location.

FIG. 11 illustrates an example process 1100 for selecting image data for processing, in accordance with examples of the present disclosure. At 1102, the process 1100 may include receiving first image data generated by a first imaging device located within a facility and at 1104, the process 1100 may include receiving second image data generated by a second imaging device located within the facility. For instance, the system(s) may receive the first image data generated by the first imaging device and the second image data generated by the second imaging device. The system(s) may also receive data representing a first location of the first imaging device, a first orientation of the first imaging device, a first period of time that the first imaging device generated the first image data, and/or additional information. Additionally, the system(s) may receive data representing a second location of the second imaging device, a second orientation of the second imaging device, a second period of time that the second imaging device generated the second image data, and/or additional information.

At 1106, the process may include determining that the first image data and the second image data were generated during a same period of time. For instance, the system(s) may determine that the first image data and the second image data were generated during the same period of time. In some examples, the system(s) make the determination based on determining that the first period of time that the first image data was generated at least partially overlapping with the second period of time that the second image data was generated. In some examples, the system(s) may further determine that the first image data was generated proximate to where the second image data was generated. In some examples, the system(s) make the determination by determining that the first location associated with the first imaging device is located proximate to (e.g., within a threshold distance to) the second location associated with the second imaging device.

At 1108, the process 1100 may include determining that the first image data and the second image data represent a user. For instance, the system(s) may determine that both the first image data and the second image data represent the user. In some examples, to make the determination, the system(s) may analyze the first image data to determine one or more first appearance-based features associated with the user. The system(s) may also analyze the second image data to determine one or more second appearance-based features associated with the user. The system(s) may then determine that the first appearance-based feature(s) are similar to the second appearance-based feature(s) and, based on that determination, determine that both the first image data and the second image data represent the user.

At 1110, the process 1100 may include determining one or more first characteristics associated with at least one of the user or an inventory location as represented by the first image data and at 1112, the process 1100 may include determining one or more second characteristics associated with at least one of the user or the inventory location as represented by the second image data. For instance, the system(s) may analyze the first image data in order to determine the first characteristic(s). As described herein, the first characteristic(s) may include, but are not limited to, a first area of the inventory location that is represented by the first image data, a first portion of the user that is visible, a first angle of the face of the user with respect to the inventory location, and/or the like. Additionally, the system(s) may analyze the second image data in order to determine the second characteristic(s). As described herein, the second characteristic(s) may include, but are not limited to, a second area of the inventory location that is represented by the second image data, a second portion of the user that is visible, a second angle of the face of the user with respect to the inventory location, and/or the like.

At 1114, the process 1100 may include selecting the first image data for processing based at least in part on the one or more first characteristics and the one or more second characteristics. For instance, the system(s) may select the first image data for gaze estimation processing based on the first characteristic(s) and the second characteristic(s). For a first example, the system(s) may determine to select image data that represents a larger portion of the inventory location. As such, if the system(s) may determine that the first area is larger than the second area, then the system(s) may select the first image data. For a second example, the system(s) may determine to select image data that represents a specific portion of the user, such as the head, the eyes, the pupils, and/or any other portion that helps with gaze detection. As such, if the system(s) determine that the first image data represents the eyes of the user while the second image data does not represent the eyes of the user, then the system(s) may again select the first image data. For a third example, the system(s) may determine to select the image data that represents an angle of the user looking at the inventory location. As such, if the system(s) determine that the first image data represents the face of the user and the portion of the inventory location for which the user is looking and the second image data does not represent the face of the user and/or the portion of the inventory location for which the user is looking, the system(s) may again select the first image data.

Figure 12:
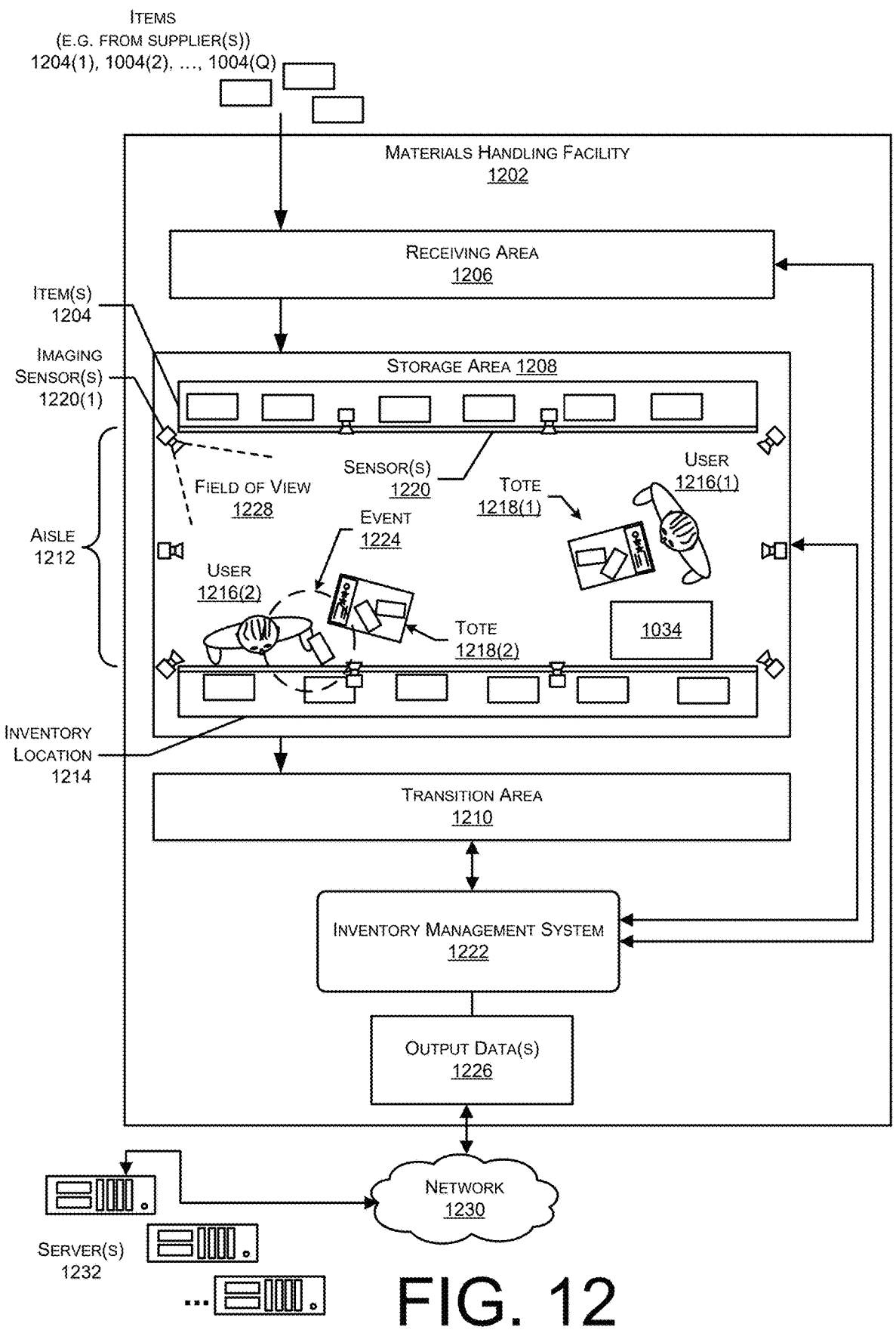
FIG. 12 is a block diagram of an example materials handling facility that includes sensors and an inventory management system configured to generate output regarding events occurring in the facility using the sensor data.
Figure 13:
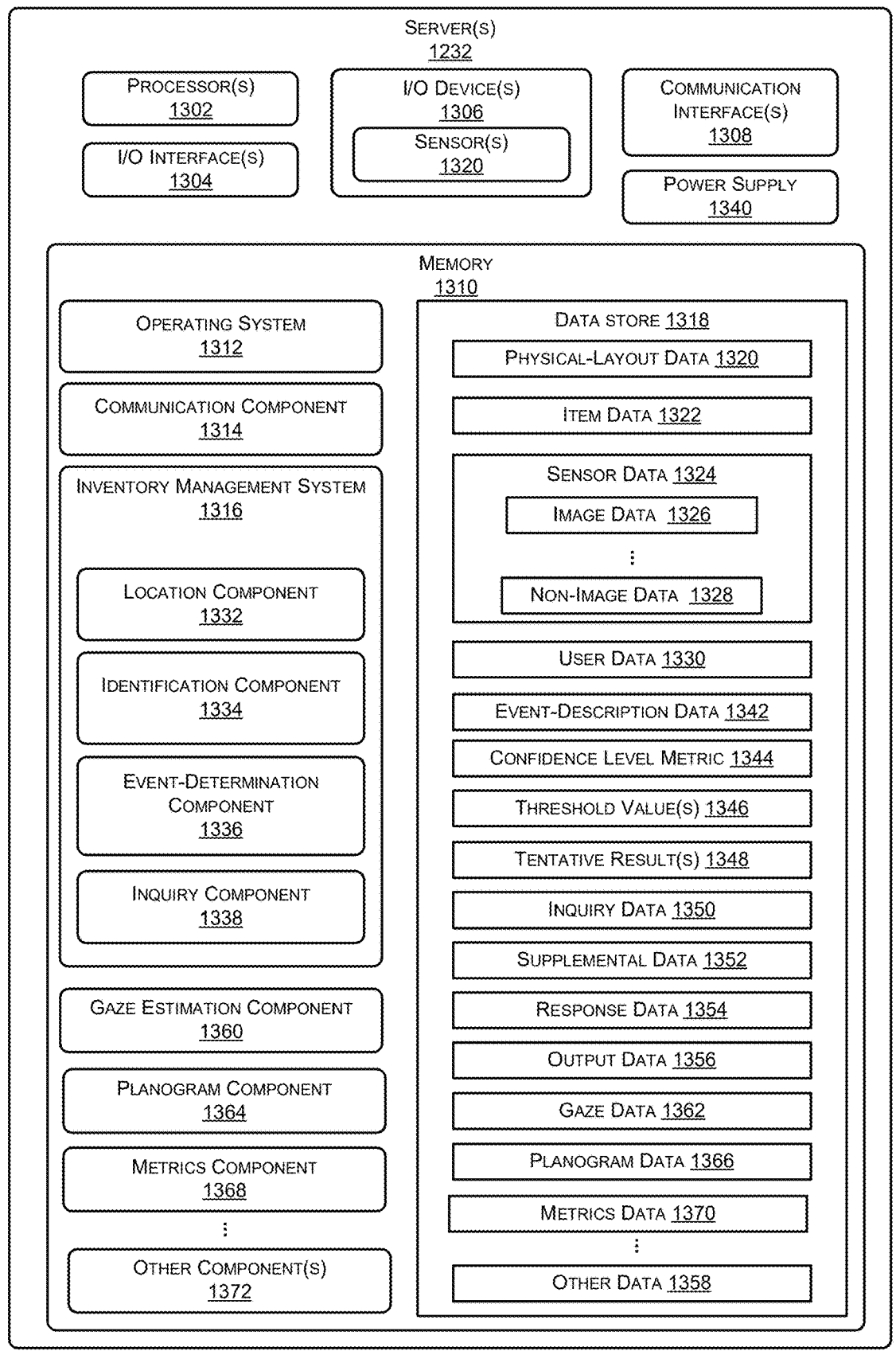
FIG. 13 illustrates a block diagram of one or more servers configured to support operation of the facility. As illustrated, the servers may include a checkout-eligibility component for determining whether a user is eligible to exit the facility with one or more picked items without performing a manual checkout of the items.

FIGS. 12 and 13 represent an illustrative materials handling environment, such as the materials handling facility 1202 (which may represent, and/or include, the facility 206), in which the techniques described herein may be applied to cameras monitoring the environments as described below. However, the following description is merely one illustrative example of an industry and environment in which the techniques described herein may be utilized. The materials handling facility 1202 (or "facility") comprises one or more physical structures or areas within which one or more items 1204(1), 1204(2), . . . , 1204(Q) (generally denoted as 1204) may be held. As used in this disclosure, letters in parentheses such as "(Q)" indicate an integer result. The items 1204 comprise physical goods, such as books, pharmaceuticals, repair parts, electronic gear, groceries, and so forth.

The facility 1202 may include one or more areas designated for different functions with regard to inventory handling. In this illustration, the facility 1202 includes a receiving area 1206, a storage area 1208, and a transition area 1210. The receiving area 1206 may be configured to accept items 1204, such as from suppliers, for intake into the facility 1202. For example, the receiving area 1206 may include a loading dock at which trucks or other freight conveyances unload the items 1204.

The storage area 1208 is configured to store the items 1204. The storage area 1208 may be arranged in various physical configurations. In one example, the storage area 1208 may include one or more aisles 1212. The aisle 1212 may be configured with, or defined by, inventory locations 1214 on one or both sides of the aisle 1212. The inventory locations 1214 may include one or more of shelves, racks, cases, cabinets, bins, floor locations, or other suitable storage mechanisms for holding or storing the items 1204. The inventory locations 1214 may be affixed to the floor or another portion of the facility's structure, or may be movable such that the arrangements of aisles 1212 may be reconfigurable. In some examples, the inventory locations 1214 may be configured to move independently of an outside operator. For example, the inventory locations 1214 may comprise a rack with a power source and a motor, operable by a computing device to allow the rack to move from one location within the facility 1202 to another.

One or more users 1216(1), 1216(2) (generally denoted as 1216), totes 1218(1), 1218(2) (generally denoted as 1218) or other material handling apparatus may move within the facility 1202. For example, the users 1216 may move about within the facility 1202 to pick or place the items 1204 in various inventory locations 1214, placing them on the totes 1218 for ease of transport. An individual tote 1218 is configured to carry or otherwise transport one or more items 1204. For example, a tote 1218 may include a basket, a cart, a bag, and so forth. In other examples, other agencies such as robots, forklifts, cranes, aerial drones, and so forth, may move about the facility 1202 picking, placing, or otherwise moving the items 1204.

One or more sensors 1220 may be configured to acquire information in the facility 1202. The sensors 1220 in the facility 1202 may include sensors fixed in the environment (e.g., ceiling-mounted cameras) or otherwise, such as sensors in the possession of users (e.g., mobile phones, tablets, etc.). The sensors 1220 may include, but are not limited to, cameras 1220(1), weight sensors, radio frequency (RF) receivers, temperature sensors, humidity sensors, vibration sensors, and so forth. The sensors 1220 may be stationary or mobile, relative to the facility 1202. For example, the inventory locations 1214 may contain cameras 1220(1) configured to acquire images of pick or placement of items 1204 on shelves, of the users 1216(1) and 1216(2) in the facility 1202, and so forth. In another example, the floor of the facility 1202 may include weight sensors configured to determine a weight of the users 1216 or another object thereupon.

During operation of the facility 1202, the sensors 1220 may be configured to provide information suitable for tracking how objects move or other occurrences within the facility 1202. For example, a series of images acquired by a camera 1220(1) may indicate removal of an item 1204 from a particular inventory location 1214 by one of the users 1216 and placement of the item 1204 on or at least partially within one of the totes 1218.

While the storage area 1208 is depicted as having one or more aisles 1212, inventory locations 1214 storing the items 1204, sensors 1220, and so forth, it is understood that the receiving area 1206, the transition area 1210, or other areas of the facility 1202 may be similarly equipped. Furthermore, the arrangement of the various areas within the facility 1202 is depicted functionally rather than schematically. For example, multiple different receiving areas 1206, storage areas 1208, and transition areas 1210 may be interspersed rather than segregated in the facility 1202.

The facility 1202 may include, or be coupled to, an inventory management system 1222, which may perform some or all of the techniques described above with reference to FIGS. 1-10 For example, the inventory management system 1222 may maintain a virtual cart of each user within the facility. The inventory management system 1222 may also store a record associated with each user indicating the location of the user, and whether the user is eligible to exit the facility with one or more items without performing a manual checkout of the items. The inventory management system 1222 may also generate and output notification data to the users, indicating whether or not they are so eligible.

As illustrated, the inventory management system 1222 may reside at the facility 1202 (e.g., as part of on-premises servers), on the servers 1232 that are remote from the facility 1202, a combination thereof. In each instance, the inventory management system 1222 is configured to identify interactions and events with and between users 1216, devices such as sensors 1220, robots, material handling equipment, computing devices, and so forth, in one or more of the receiving area 1206, the storage area 1208, or the transition area 1210. As described above, some interactions may further indicate the existence of one or more events 1224, or predefined activities of interest. For example, events 1224 may include the entry of the user 1216 to the facility 1202, stocking of items 1204 at an inventory location 1214, picking of an item 1204 from an inventory location 1214, returning of an item 1204 to an inventory location 1214, placement of an item 1204 within a tote 1218, movement of users 1216 relative to one another, gestures by the users 1216, and so forth. Other events 1224 involving users 1216 may include the user 1216 providing authentication information in the facility 1202, using a computing device at the facility 1202 to authenticate the user to the inventory management system 1222, and so forth. Some events 1224 may involve one or more other objects within the facility 1202. For example, the event 1224 may comprise movement within the facility 1202 of an inventory location 1214, such as a counter mounted on wheels. Events 1224 may involve one or more of the sensors 1220. For example, a change in operation of a sensor 1220, such as a sensor failure, change in alignment, and so forth, may be designated as an event 1224. Continuing the example, movement of a camera 1220(1) resulting in a change in the orientation of the field of view 1228 (such as resulting from someone or something bumping the camera 1220(1)) may be designated as an event 1224.

By determining the occurrence of one or more of the events 1224, the inventory management system 1222 may generate output data 1226. The output data 1226 comprises information about the event 1224. For example, where the event 1224 comprises an item 1204 being removed from an inventory location 1214, the output data 1226 may comprise an item identifier indicative of the particular item 1204 that was removed from the inventory location 1214 and a user identifier of a user that removed the item.

The inventory management system 1222 may use one or more automated system(s) to generate the output data 1226. For example, an artificial neural network, one or more classifiers, or other automated machine learning techniques may be used to process the sensor data from the one or more sensors 1220 to generate output data 1226. For example, the inventory management system 1222 may perform some or all of the techniques for generating and utilizing a classifier for identifying user activity in image data, as described in detail above. The automated system(s) may operate using probabilistic or non-probabilistic techniques. For example, the automated system(s) may use a Bayesian network. In another example, the automated system(s) may use support vector machines to generate the output data 1226 or the tentative results. The automated system(s) may generate confidence level data that provides information indicative of the accuracy or confidence that the output data 1226 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 99%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1204, user 1216, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1216 may pick an item 1204(1) such as a perfume bottle that is generally cubical in shape from the inventory location 1214. Other items 1204 at nearby inventory locations 1214 may be predominantly spherical. Based on the difference in shape (cube vs. sphere) from the adjacent items, and the correspondence in shape with the previously stored image of the perfume bottle item 1204(1) (cubical and cubical), the confidence level that the user has picked up the perfume bottle item 1204(1) is high.

In some situations, the automated techniques may be unable to generate output data 1226 with a confidence level above a threshold result. For example, the automated techniques may be unable to distinguish which user 1216 in a crowd of users 1216 has picked up the item 1204 from the inventory location 1214. In other situations, it may be desirable to provide human confirmation of the event 1224 or of the accuracy of the output data 1226. For example, some items 1204 may be deemed age restricted such that they are to be handled only by users 1216 above a minimum age threshold.

In instances where human confirmation is desired, sensor data associated with an event 1224 may be processed to generate inquiry data. The inquiry data may include a subset of the sensor data associated with the event 1224. The inquiry data may also include one or more of one or more tentative results as determined by the automated techniques, or supplemental data. The subset of the sensor data may be determined using information about the one or more sensors 1220. For example, camera data such as the location of the camera 1220(1) within the facility 1202, the orientation of the camera 1220(1), and a field of view 1228 of the camera 1220(1) may be used to determine if a particular location within the facility 1202 is within the field of view 1228. The subset of the sensor data may include images that may show the inventory location 1214 or that the item 1204 was stowed. The subset of the sensor data may also omit images from other cameras 1220(1) that did not have that inventory location 1214 in the field of view 1228. The field of view 1228 may comprise a portion of the scene in the facility 1202 that the sensor 1220 is able to generate sensor data about.

Continuing the example, the subset of the sensor data may comprise a video clip acquired by one or more cameras 1220(1) having a field of view 1228 that includes the item 1204. The tentative results may comprise the "best guess" as to which items 1204 may have been involved in the event 1224. For example, the tentative results may comprise results determined by the automated system that have a confidence level above a minimum threshold.

The facility 1202 may be configured to receive different kinds of items 1204 from various suppliers and to store them until a customer orders or retrieves one or more of the items 1204. A general flow of items 1204 through the facility 1202 is indicated by the arrows of FIG. 12. Specifically, as illustrated in this example, items 1204 may be received from one or more suppliers, such as manufacturers, distributors, wholesalers, and so forth, at the receiving area 1206. In various examples, the items 1204 may include merchandise, commodities, perishables, or any suitable type of item 1204, depending on the nature of the enterprise that operates the facility 1202. The receiving of the items 1204 may comprise one or more events 1224 for which the inventory management system 1222 may generate output data 1226.

Upon being received from a supplier at receiving area 1206, the items 1204 may be prepared for storage. For example, items 1204 may be unpacked or otherwise rearranged. The inventory management system 1222 may include one or more software applications executing on a computer system to provide inventory management functions based on the events 1224 associated with the unpacking or rearrangement. These inventory management functions may include maintaining information indicative of the type, quantity, condition, cost, location, weight, or any other suitable parameters with respect to the items 1204. The items 1204 may be stocked, managed, or dispensed in terms of countable, individual units or multiples, such as packages, cartons, crates, pallets, or other suitable aggregations. Alternatively, some items 1204, such as bulk products, commodities, and so forth, may be stored in continuous or arbitrarily divisible amounts that may not be inherently organized into countable units. Such items 1204 may be managed in terms of measurable quantity such as units of length, area, volume, weight, time, duration, or other dimensional properties characterized by units of measurement. Generally speaking, a quantity of an item 1204 may refer to either a countable number of individual or aggregate units of an item 1204 or a measurable amount of an item 1204, as appropriate.

After arriving through the receiving area 1206, items 1204 may be stored within the storage area 1208. In some examples, like items 1204 may be stored or displayed together in the inventory locations 1214 such as in bins, on shelves, hanging from pegboards, and so forth. In this example, all items 1204 of a given kind are stored in one inventory location 1214. In other examples, like items 1204 may be stored in different inventory locations 1214. For example, to optimize retrieval of certain items 1204 having frequent turnover within a large physical facility 1202, those items 1204 may be stored in several different inventory locations 1214 to reduce congestion that might occur at a single inventory location 1214. Storage of the items 1204 and their respective inventory locations 1214 may comprise one or more events 1224.

When a customer order specifying one or more items 1204 is received, or as a user 1216 progresses through the facility 1202, the corresponding items 1204 may be selected or "picked" from the inventory locations 1214 containing those items 1204. In various examples, item picking may range from manual to completely automated picking. For example, in one example, a user 1216 may have a list of items 1204 they desire and may progress through the facility 1202 picking items 1204 from inventory locations 1214 within the storage area 1208, and placing those items 1204 into a tote 1218. In other examples, employees of the facility 1202 may pick items 1204 using written or electronic pick lists derived from customer orders. These picked items 1204 may be placed into the tote 1218 as the employee progresses through the facility 1202. Picking may comprise one or more events 1224, such as the user 1216 in moving to the inventory location 1214, retrieval of the item 1204 from the inventory location 1214, and so forth.

After items 1204 have been picked, they may be processed at a transition area 1210. The transition area 1210 may be any designated area within the facility 1202 where items 1204 are transitioned from one location to another or from one entity to another. For example, the transition area 1210 may be a packing station within the facility 1202. When the item 1204 arrives at the transition area 1210, the items 1204 may be transitioned from the storage area 1208 to the packing station. The transitioning may comprise one or more events 1224. Information about the transition may be maintained by the inventory management system 1222 using the output data 1226 associated with those events 1224.

In another example, if the items 1204 are departing the facility 1202 a list of the items 1204 may be obtained and used by the inventory management system 1222 to transition responsibility for, or custody of, the items 1204 from the facility 1202 to another entity. For example, a carrier may accept the items 1204 for transport with that carrier accepting responsibility for the items 1204 indicated in the list. In another example, a customer may purchase or rent the items 1204 and remove the items 1204 from the facility 1202. The purchase or rental may comprise one or more events 1224.

The inventory management system 1222 may access or generate sensor data about the facility 1202 and the contents therein including the items 1204, the users 1216, the totes 1218, and so forth. The sensor data may be acquired by one or more of the sensors 1220, data provided by other system(s), and so forth. For example, the sensors 1220 may include cameras 1220(1) configured to acquire image data of scenes in the facility 1202. The image data may comprise still images, video, or a combination thereof. The image data may be processed by the inventory management system 1222 to determine a location of the user 1216, the tote 1218, the identifier of the user 1216, and so forth. As used herein, the identity of the user may represent a unique identifier of the user, an identifier that distinguishes the user amongst other users being located within the environment, or the like.

The inventory management system 1222, or system(s) coupled thereto, may be configured to associate an account with the user 1216, as well as to determine other candidate users. An account of the user 1216 may be determined before, during, or after entry to the facility 1202.

In some instances, the inventory management system 1222 groups users within the facility into respective sessions. That is, the inventory management system 1222 may utilize the sensor data to determine groups of users that are effectively "together" (e.g., shopping together). In some instances, a particular session may include multiple users that entered the facility 1202 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 1218. Noting the child and the mother as belonging to the same session may increase the chances of successfully adding the box of cereal to the virtual shopping cart of the mother.

By determining the occurrence of one or more events 1224 and the output data 1226 associated therewith, the inventory management system 1222 is able to provide one or more services to the users 1216 of the facility 1202. By utilizing one or more facility associates to process inquiry data and generate response data that may then be used to produce output data 1226, overall accuracy of the system may be enhanced. The enhanced accuracy may improve the user experience of the one or more users 1216 of the facility 1202. In some examples, the output data 1226 may be transmitted over a network 1230 to one or more servers 1232 (e.g., remote system(s)).

FIG. 13 illustrates a block diagram of the server(s) 1232. The server(s) 1232 may be physically present at the facility 1102, may be accessible by the network 1130, or a combination of both. The server(s) 1232 do not require end-user knowledge of the physical location and configuration of the system that delivers the services. Common expressions associated with the server(s) 1232 may include "on-demand computing," "software as a service (SaaS)," "cloud services," "data centers," "remote system(s)", and so forth. Services provided by the server(s) 1232 may be distributed across one or more physical or virtual devices.

The server(s) 1232 may include one or more hardware processors 1302 (processors) configured to execute one or more stored instructions. The processor(s) 1302 may comprise one or more cores. The server(s) 1232 may include one or more input/output (I/O) interfaces 1304 to allow the processor 1302 or other portions of the server(s) 1232 to communicate with other devices. The I/O interface(s) 1304 may comprise Inter-Integrated Circuit (I2C), Serial Peripheral Interface bus (SPI), Universal Serial Bus (USB) as promulgated by the USB Implementers Forum, and so forth.

The server(s) 1232 may also include one or more communication interfaces 1308. The communication interface(s) 1308 are configured to provide communications between the server(s) 1232 and other devices, such as the sensors 1130, the interface devices, routers, the electronic device 1232, and so forth. The communication interface(s) 1308 may include devices configured to couple to personal area networks (PANs), wired and wireless local area networks (LANs), wired and wireless wide area networks (WANs), and so forth. For example, the communication interface(s) 1308 may include devices compatible with Ethernet, Wi-Fi™, and so forth. The server(s) 1232 may also include one or more busses or other internal communications hardware or software that allow for the transfer of data between the various modules and components of the servers 1232.

The server(s) 1232 may also include a power supply 1340. The power supply 1340 is configured to provide electrical power suitable for operating the components in the server(s) 1232.

The server(s) 1232 may further include one or more memories 1310. The memory 1310 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1310 provides storage of computer-readable instructions, data structures, program modules, and other data for the operation of the servers 1232. A few example functional modules are shown stored in the memory 1310, although the same functionality may alternatively be implemented in hardware, firmware, or as a system on a chip (SOC).

The memory 1310 may include at least one operating system (OS) component 1312. The OS component 1312 is configured to manage hardware resource devices such as the I/O interface(s) 1304, the communication interface(s) 1308, and provide various services to applications or components executing on the processor(s) 1302. The OS component 1312 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1310. These components may be executed as foreground applications, background tasks, daemons, and so forth. A communication component(s) 1314 may be configured to establish communications with one or more of the sensors 1130, one or more of the devices used by associates, other server(s) 1232, or other devices. The communications may be authenticated, encrypted, and so forth.

The memory 1310 may store an inventory management system 1316. The inventory management system 1316 is configured to provide the inventory functions as described herein with regard to the inventory management system 1132. For example, the inventory management system 1316 may track movement of items 1104 in the facility 1102, generate user interface data, and so forth.

The inventory management system 1316 may access information stored in one or more data stores 1318 in the memory 1310. The data store(s) 1318 may use a flat file, database, linked list, tree, executable code, script, or other data structure to store the information. In some examples, the data store(s) 1318 or a portion of the data store(s) 1318 may be distributed across one or more other devices including other servers 1232, network attached storage devices, and so forth.

The data store(s) 1318 may include physical layout data 1320. The physical layout data 1320 provides a mapping of physical locations within the physical layout of devices and objects such as the sensors 1130, inventory locations 1114, and so forth. The physical layout data 1320 may indicate the coordinates within the facility 1102 of an inventory location 1114, sensors 1130 within view of that inventory location 1114, and so forth. For example, the physical layout data 1320 may include camera data comprising one or more of a location within the facility 1102 of a camera 1130(1), orientation of the camera 1130(1), the operational status, and so forth. Continuing example, the physical layout data 1320 may indicate the coordinates of the camera 1130(1), pan and tilt information indicative of a direction that the field of view 1138 is oriented along, whether the camera 1130(1) is operating or malfunctioning, and so forth.

In some examples, the inventory management system 1316 may access the physical layout data 1320 to determine if a location associated with the event 1134 is within the field of view 1138 of one or more sensors 1130. Continuing the example above, given the location within the facility 1102 of the event 1134 and the camera data, the inventory management system 1316 may determine the cameras 1130(1) that may have generated images of the event 1134.

The item data 1322 comprises information associated with the items 1104. The information may include information indicative of one or more inventory locations 1114 at which one or more of the items 1104 are stored. The item data 1322 may also include order data, SKU or other product identifier, price, quantity on hand, weight, expiration date, images of the item 1104, detail description information, ratings, ranking, and so forth. The inventory management system 1316 may store information associated with inventory management functions in the item data 1322.

The data store(s) 1318 may also include sensor data 1324. The sensor data 1324 comprises information acquired from, or based on, the one or more sensors 1130. For example, the sensor data 1324 may comprise 3D information about an object in the facility 1102. As described above, the sensors 1130 may include a camera 1130(1), which is configured to acquire one or more images. These images may be stored as the image data 1326. The image data 1326 may comprise information descriptive of a plurality of picture elements or pixels. Non-image data 1328 may comprise information from other sensors 1130, such as input from microphones, weight sensors, and so forth.

User data 1330 may also be stored in the data store(s) 1318. The user data 1330 may include identity data, information indicative of a profile, purchase history, location data, and so forth. Individual users 1116 or groups of users 1116 may selectively provide user data 1330 for use by the inventory management system 1132. The individual users 1116 or groups of users 1116 may also authorize collection of the user data 1330 during use of the facility 1102 or access to user data 1330 obtained from other system(s). For example, the user 1116 may opt-in to collection of the user data 1330 to receive enhanced services while using the facility 1102.

In some examples, the user data 1330 may include information designating a user 1116 for special handling. For example, the user data 1330 may indicate that a particular user 1116 has been associated with an increased number of errors with respect to output data 1136. The inventory management system 1316 may be configured to use this information to apply additional scrutiny to the events 1134 associated with this user 1116. For example, events 1134 that include an item 1104 having a cost or result above the threshold amount may be provided to a facility associate for processing regardless of the determined level of confidence in the output data 1136 as generated by the automated system.

The inventory management system 1316 may include one or more of a location component 1332, identification component 1334, event-determination component 1336, and inquiry component 1338.

The location component 1332 functions to locate items or users within the environment of the facility to allow the inventory management system 1316 to assign certain events to the correct users. That is, the location component 1332 may assign unique identifiers to users as they enter the facility and, with the users' consent, may locate the users throughout the facility 1102 over the time they remain in the facility 1102. The location component 1332 may perform this locating using sensor data 1324, such as the image data 1326. For example, the location component 1332 may receive the image data 1326 and may use techniques to identify users from the images. After identifying a particular user within the facility, the location component 1332 may then locate the user within the images as the user moves throughout the facility 1102. Further, should the location component 1332 temporarily "lose" a particular user, the location component 1332 may again attempt to identify the users within the facility based on techniques.

Therefore, upon receiving the indication of the time and location of the event in question, the location component 1332 may query the data store 1318 to determine which one or more users were at or within a threshold distance of the location of the event at the particular time of the event. Further, the location component 1332 may assign different confidence levels to different users, with the confidence levels indicating how likely it is that each corresponding user is the user that is in fact associated with the event of interest.

The location component 1332 may access the sensor data 1324 in order to determine this location data of the user and/or items. The location data provides information indicative of a location of an object, such as the item 1104, the user 1116, the tote 1118, and so forth. The location may be absolute with respect to the facility 1102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 1102, 5.2 m from an inventory location 1114 along a heading of 1613°, and so forth. For example, the location data may indicate that the user 1116(1) is 25.2 m along the aisle 1113(1) and standing in front of the inventory location 1114. In comparison, a relative location may indicate that the user 1116(1) is 32 cm from the tote 1118 at a heading of 73° with respect to the tote 1118. The location data may include orientation information, such as which direction the user 1116 is facing. The orientation may be determined by the relative direction the user's 1116 body is facing. In some examples, the orientation may be relative to the interface device. Continuing the example, the location data may indicate that the user 1116(1) is oriented with a heading of 0°, or looking north. In another example, the location data may indicate that the user 1116 is facing towards the interface device.

The identification component 1334 is configured to identify an object. In one example, the identification component 1334 may be configured to identify an item 1104. In another example, the identification component 1334 may be configured to identify the user 1116. For example, the identification component 1334 may use facial recognition techniques to process the image data 1326 and determine the user 1116 depicted in the images by comparing the characteristics in the image data 1326 with previously stored results. The identification component 1334 may also access data from other sensors 1130, such as from an RFID reader, an RF receiver, and so forth.

The event-determination component 1336 is configured to process the sensor data 1324 and generate output data 1136, and may include components described above. The event-determination component 1336 may access information stored in the data store(s) 1318 including, but not limited to, event-description data 1342, confidence levels 1344, or threshold values 1346. In some instances, the event-determination component 1336 may be configured to perform some or all of the techniques described above with regards to the event-determination component 1336. For instance, the event-determination component 1336 may be configured to create and utilize event classifiers for identifying events (e.g., predefined activity) within image data, potentially without use of other sensor data acquired by other sensors in the environment.

The event-description data 1342 comprises information indicative of one or more events 1134. For example, the event-description data 1342 may comprise predefined profiles that designate movement of an item 1104 from an inventory location 1114 with the event 1134 of "pick". The event-description data 1342 may be manually generated or automatically generated. The event-description data 1342 may include data indicative of triggers associated with events occurring in the facility 1102. An event may be determined as occurring upon detection of the trigger. For example, sensor data 1324 such as a change in weight from a weight sensor 1130 at an inventory location 1114 may trigger detection of an event of an item 1104 being added or removed from the inventory location 1114. In another example, the trigger may comprise an image of the user 1116 reaching a hand toward the inventory location 1114. In yet another example, the trigger may comprise two or more users 1116 approaching to within a threshold distance of one another.

The event-determination component 1336 may process the sensor data 1324 using one or more techniques including, but not limited to, artificial neural networks, classifiers, decision trees, support vector machines, Bayesian networks, and so forth. For example, the event-determination component 1336 may use a decision tree to determine occurrence of the "pick" event 1134 based on sensor data 1324. The event-determination component 1336 may further use the sensor data 1324 to determine one or more tentative results 1348. The one or more tentative results 1348 comprise data associated with the event 1134. For example, where the event 1134 comprises a disambiguation of users 1116, the tentative results 1348 may comprise a list of possible user 1116 identities. In another example, where the event 1134 comprises a disambiguation between items, the tentative results 1348 may comprise a list of possible item identifiers. In some examples, the tentative result 1348 may indicate the possible action. For example, the action may comprise the user 1116 picking, placing, moving an item 1104, damaging an item 1104, providing gestural input, and so forth.

In some examples, the tentative results 1348 may be generated by other components. For example, the tentative results 1348 such as one or more possible identities or locations of the user 1116 involved in the event 1134 may be generated by the location component 1332. In another example, the tentative results 1348 such as possible items 1104 that may have been involved in the event 1134 may be generated by the identification component 1334.

The event-determination component 1336 may be configured to provide a confidence level 1344 associated with the determination of the tentative results 1348. The confidence level 1344 provides indicia as to the expected level of accuracy of the tentative result 1348. For example, a low confidence level 1344 may indicate that the tentative result 1348 has a low probability of corresponding to the actual circumstances of the event 1134. In comparison, a high confidence level 1344 may indicate that the tentative result 1348 has a high probability of corresponding to the actual circumstances of the event 1134.

In some examples, the tentative results 1348 having confidence levels 1344 that exceed the threshold may be deemed to be sufficiently accurate and thus may be used as the output data 1356. For example, the event-determination component 1336 may provide tentative results 1348 indicative of the three possible items 1104(1), 1104(2), and 1104(3) corresponding to the "pick" event 1134. The confidence levels 1344 associated with the possible items 1104(1), 1104(2), and 1104(3) may be 25%, 70%, 99%, respectively. Continuing the example, the threshold value 1346 may be set such that confidence level 1344 of 99% are deemed to be sufficiently accurate. As a result, the event-determination component 1336 may designate the "pick" event 1134 as involving item 1104(3).

The inquiry component 1338 may be configured to use at least a portion of the sensor data 1324 associated with the event 1134 to generate inquiry data 1350. In some examples, the inquiry data 1350 may include one or more of the tentative results 1348 or supplemental data 1352. The inquiry component 1338 may be configured to provide inquiry data 1350 to one or more devices associated with one or more human associates.

An associate user interface is presented on the respective devices of associates. The associate may generate response data 1354 by selecting a particular tentative result 1348, entering new information, indicating that they are unable to answer the inquiry, and so forth.

The supplemental data 1352 comprises information associated with the event 1134 or that may be useful in interpreting the sensor data 1324. For example, the supplemental data 1352 may comprise previously stored images of the items 1104. In another example, the supplemental data 1352 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1326 during presentation to an associate.

The inquiry component 1338 processes the response data 1354 provided by the one or more associates. The processing may include calculating one or more statistical results associated with the response data 1354. For example, statistical results may include a count of the number of times associates selected a particular tentative result 1348, determination of a percentage of the associates that selected a particular tentative result 1348, and so forth.

The inquiry component 1338 is configured to generate the output data 1356 based at least in part on the response data 1354. For example, given that a majority of the associates returned response data 1354 indicating that the item 1104 associated with the "pick" event 1134 is item 1104 (5), the output data 1136 may indicate that the item 1104 (5) was picked.

The inquiry component 1338 may be configured to selectively distribute inquiries to particular associates. For example, some associates may be better suited to answering particular types of inquiries. Performance data, such as statistical data about the performance of the associates, may be determined by the inquiry component 1338 from the response data 1354 provided by the associates. For example, information indicative of a percentage of different inquiries in which the particular associate selected response data 1354 that disagreed with the majority of associates may be maintained. In some examples, test or practice inquiry data 1350 having a previously known correct answer may be provided to the associate for training or quality assurance purposes. The determination of the set of associates to use may be based at least in part on the performance data.

By using the inquiry component 1338, the event-determination component 1336 may be able to provide high reliability output data 1356 that accurately represents the event 1134. The output data 1356 generated by the inquiry component 1338 from the response data 1354 may also be used to further train the automated system(s) used by the inventory management system 1316. For example, the sensor data 1324 and the output data 1356, based on response data 1354, may be provided to one or more of the components of the inventory management system 1316 for training in process improvement. Continuing the example, this information may be provided to an artificial neural network, Bayesian network, and so forth, to further train these system(s) such that the confidence level 1344 and the tentative results 1348 produced in the future for the same or similar input is improved. Finally, as FIG. 13 illustrates, the server(s) 1232 may store and/or utilize other data 1358.

As further illustrated in the example of FIG. 13, the server(s) 1232 may include a gaze estimation component 1360. The gaze estimation component 1360 may be configured to perform one or more of the gaze estimation techniques described herein. For example, the gaze estimation components 1360 may be configured to analyze image data 1326 and, based on the analysis, determine that a portion of the image data 1326 represents a portion of a user, such as the head, eye(s), pupil(s), and/or the like of the user. The gaze estimation component 1360 may then further analyze the image data 1326 in order to determine gaze points indicating locations on an inventory location for which the user was looking over a period of time. The gaze estimation component 1360 may then be configured generate gaze data 1362 that indicates the portion(s) of the inventory location for which the user was looking, the period(s) of time that the user was looking at the portion(s) of the inventory location, and/or the like. As described herein, the gaze data 1362 may represent a heatmap associated with the inventory location, such as the heatmap 402.

The server(s) 1232 may further include a planogram component 1364. The planogram component 1364 may be configured to analyze planogram data 1366 in order to determine identifiers of items located at various portions of inventory locations. For example, based on the gaze estimation component 1360 determining that a user was looking at a portion of an inventory location, the planogram component 1364 may be configured to perform the processes described herein in order to identify the inventory location. The planogram component 1364 may then be configured to identify the planogram data 1366 that is associated with the inventory location. As described herein, in some examples, the planogram data 1366 may be associated with the facility 1102 and, as such, represent the layout of the facility 1102, such as the locations of the inventory locations, the locations of items on the inventory locations, and/or the like. In other examples, the planogram data 1366 may be associated with a single inventory location and, as such, represent the locations of the items on the inventory location. In either of the examples, the planogram component 1364 may then be configured to use the planogram data to determine the identifier of the item that is associated with the portion of the inventory location.

As further illustrated in the example of FIG. 13, the server(s) 1232 may include a metrics component 1368. The metrics component 1368 may be configured to perform one or more of the processes described herein in order to generate metrics data 1370. As described herein, in some examples, the metrics data 1370 may be specific to a user and, as such, represent an identifier of the inventory location for which the user was looking, portion(s) of the inventory location for which the user was looking, identifier(s) of item(s) associated with the portion(s) of the inventory location, a total period of time that the user was looking at the inventory location, period(s) of time that the user was looking at the different portion(s) of the inventory location, period(s) of time that the user was looking at the item(s), an identifier associated with the user, and/or any other information. Additionally, or alternatively, in some examples, the metrics data 1370 may be aggregated for more than one user and, as such, represent an identifier of the inventory location for which users were looking, portion(s) of the inventory location for which the users were looking, identifier(s) of item(s) associated with the portion(s) of the inventory location, a total period of time that the users were looking at the inventory location, total period(s) of time that the users were looking at the different portion(s) of the inventory location, total period(s) of time that the users were looking at the item(s), and/or any other information.

In some examples, the system(s) described herein may represent, and/or include, at least a portion of the server(s) 1232. For example, the system(s) may include all of the components of the server(s) 1232. For another examples, the system(s) may only include a portion of the components of the server(s). For instance, the system(s) may include at least the gaze estimation component 1360, the planogram component 1364, and the metrics component 1368. In such examples, the server(s) 1232 may be split into more than one server 1232, where each server 1232 includes at least a portion of the components and where the servers 1232 are able communicate with one another in order to share data.

Additionally, while the example of FIG. 13 illustrates the server(s) 1232 as including the location component 1332, the identification component 1334, the event-determination component 1336, the inquiry component 1338, the gaze estimation component 1360, the planogram component 1364, and the metrics component 1368, in other examples, the server(s) 1232 may include one or more other components 1372.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer system(s). Thus, although certain steps have been described as being performed by certain devices, software programs, processes, or entities, this need not be the case, and a variety of alternative examples will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
one or more processors; and
one or more computer-readable media storing instructions that, when executed by the one or more processors, cause the system to perform operations comprising:
receiving video data generated by a camera associated with a shopping cart, the shopping cart being located within a facility that includes an inventory location storing one or more items, the video data corresponding to a first period of time;
determining that a portion of the video data represents a head of a user;
determining, based at least in part on the portion of the video data, gaze vectors indicating directions that the user looked during a second period of time that is within the first period of time;
determining, based at least in part on the gaze vectors, gaze points indicating focal points for a gaze of the user on a portion of the inventory location that the user was looking at during the second period of time;
generating, based at least in part on the gaze points, a heatmap associated with the inventory location for the user, the heatmap indicating that the user was looking at the portion of the inventory location for the second period of time;
determining a present location associated with the user within the facility;
identifying the inventory location based at least in part on the present location;
identifying a planogram associated with the inventory location;
determining, based at least in part on the planogram, an identifier of an item, of the one or more items, that is associated with the portion of the inventory location; and
generating metrics data representing at least the identifier of the item and the second period of time.

2. The system as recited in claim 1, the operations further comprising:
determining an account associated with the shopping cart; and
determining, based at least in part on the account, an identifier associated with the user,
wherein the metrics data further represents the identifier associated with the user.

3. The system as recited in claim 1, the operations further comprising:
receiving second video data generated by the camera or a second camera within the facility;
determining that a portion of the second video data represents a head of a second user;
determining, based at least in part on the portion of the second video data, second gaze vectors indicating directions that the second user looked during a third period of time;
determining, based at least in part on the second gaze vectors, second gaze points representing a second portion of the inventory location that the second user was looking at during the third period of time; and
generating, based at least in part on the second gaze points, a second heatmap associated with the inventory location for the second user, the second heatmap indicating that the second user looked at the portion of the inventory location for the third period of time,
wherein the metrics data further represents the third period of time.

4. A method comprising:
receiving image data generated by a camera associated with a shopping cart, the shopping cart being located within a facility;
determining that the image data represents a user;
determining an identifier of the user;
determining, based at least in part on the image data, a gaze point indicating focal points for a gaze of the user on a portion of an inventory location that the user was looking at a time;
generating, based at least in part on the gaze point, first data indicating that the user was looking at the portion of the inventory location at the time;
determining, using second data, an identifier of an item associated with the portion of the inventory location; and
based at least in part on the first data, generating third data indicating at least the identifier of the user, the identifier of the item, and a timing indication associated with the time.

5. The method as recited in claim 4, wherein determining the identifier of the user comprises:
determining that an account is associated with the shopping cart; and
determining that the identifier of the user is associated with the account.

6. The method as recited in claim 4, wherein determining the identifier of the user comprises generating, based at least in part on the image data representing the user, a unique identifier associated with the user, the unique identifier including the identifier.

7. The method as recited in claim 4, further comprising:
receiving second image data generated by a second camera within the facility;
determining that the second image data represents the user;
determining, based at least in part on the second image data, a second gaze point indicating the portion of the inventory location that the user was looking at the time; and
generating, based at least in part on the second gaze point, fourth data indicating that the user was looking at the portion of the inventory location at the time,
wherein generating the third data is further based at least in part on the fourth data.

8. The method as recited in claim 7, further comprising:
determining, based at least in part on the gaze point, a first period of time that the user was looking at the portion of the inventory location, wherein the first period of time includes the time and the first data indicates the first period of time;

determining, based at least in part on the second gaze point, a second period of time that the user was looking at the portion of the inventory location, wherein the second period of time includes the time and the fourth data indicates the second period of time; and determining a third period of time based at least in part on the first period of time and the second period of time, wherein the timing indication includes the third period of time.

9. The method as recited in claim 7, further comprising:

determining, based at least in part on the gaze point, a first period of time that the user was looking at the portion of the inventory location, wherein the first period of time includes the time and the first data indicates the first period of time;

determining a first confidence associated with the first period of time;

determining, based at least in part on the second gaze point, a second period of time that the user was looking at the portion of the inventory location, wherein the second period of time includes the time and the fourth data indicates the second period of time;

determining a second confidence associated with the second period of time; and determining that the first confidence is greater than the second confidence, wherein the timing indication includes the first period of time based at least in part on the first confidence being greater than the second confidence.

10. The method as recited in claim 4, wherein generating the first data comprises generating the first data representing a heatmap associated with the inventory location for the user, the heatmap indicating that the user looked at the portion of the inventory location at the time.

11. The method as recited in claim 4, further comprising:

determining, based at least in part on the gaze point, a first density of gaze points associated with the portion of the inventory location;

determining, based at least in part on the image data, a second gaze point indicating a second portion of the inventory location that the user was looking at a second time;

determining, based at least in part on the second gaze point, a second density of gaze points associated with the second portion of the inventory location;

determining a first period of time based at least in part on the first density of gaze points, the first period of time including at least the time; and determining a second period of time based at least in part on the second density of gaze points, the second period of time including at least the second time, wherein the first data further indicates that the user looked at the portion of the inventory location for the first period of time and the second portion of the inventory location for the second period of time.

12. The method as recited in claim 4, further comprising:

determining that a portion of the image data represents a head of the user; and determining, based at least in part on the portion of the image data, a gaze vector indicating a direction that the user was looking at the time; and wherein determining the gaze point is based at least in part on the gaze vector.

13. The method as recited in claim 4, further comprising:

determining a first location associated with the camera within the facility;

determining, based at least in part on the first location, a second location of the user within the facility at the time;

identifying the inventory location based at least in part on the second location; and identifying the planogram associated with the inventory location.

14. The method as recited in claim 4, further comprising:

determining, based at least in part on the first data, a period of time that the user was looking at the portion of the inventory location; and determining that the period of time satisfies a threshold period of time, wherein generating the third data is based at least in part on the period of time satisfying the threshold period of time.

15. The method as recited in claim 4, further comprising:

determining a first feature associated with the user as represented by the image data receiving second image data generated by a second camera within the facility;

determining that the second image data represents a second user at the time;

determining a second feature associated with the second user as represented by the second image data;

determining that the first feature is similar to the second feature;

based at least in part on the first feature being similar to the second feature, determining that the second user is a same user as the user;

determining, based at least in part on the image data, one or more first characteristics associated with at least one of the user or the inventory location;

determining, based at least in part on the second image data, one or more second characteristics associated with at least one of the second user or the inventory location; and selecting the image data for generating the first data based at least in part on the one or more first characteristics and the one or more second characteristics.

16. The method as recited in claim 15, wherein:

determining the one or more first characteristics comprises determining at least one of:
 a first area of the inventory location as represented by the image data;
 a first portion of the user that is represented by the image data;
 a first angle of the user with respect to the inventory location as represented by the image data;
 a first portion of the user that is occluded; or
 a first portion of the inventory location that is occluded; and determining the one or more second characteristics comprises determining at least one of:
 a second area of the inventory location as represented by the second image data;
 a second portion if the second user that is represented by the second image data;
 a second angle of the second user with respect to the inventory location as represented by the second image data;
 a second portion of the second user that is occluded; or
 a second portion of the inventory location that is occluded.

17. The method as recited in claim 4, wherein:
the second data is at least a portion of the image data; and
determining the identifier of the item comprises:
   analyzing the second data; and
     determining that the second data represents the identifier of the item.

18. The method as recited in claim 4, wherein:
the second data represents locations of items within the facility; and
determining the identifier of the item comprises:
   determining a location of the inventory location within the facility; and
   determining, based at least in part on the location of the inventory location and the second data, the identifier of the item.

19. A system comprising:
one or more processors; and
one or more computer-readable media storing instructions that, when executed by the one or more processors, cause the one or more processors to perform operations comprising:
   receiving first image data generated by a first camera within a facility;
   determining that the first image data represents a user;
   determining, based at least in part on the first image data, a first gaze point indicating a first focal point on an inventory location that the user was looking at a time;
   receiving second image data generated by a second camera within the facility;
   determining, based at least in part on the second image data, a second gaze point indicating a second focal point on the inventory location that the user was looking at the time;
   generating, based at least in part on the first gaze point and the second gaze point, first data indicating that the user was looking at the inventory location at the time;
   determining, using second data associated with the facility, an identifier associated with the inventory location; and
   generating third data indicating at least the identifier associated with the inventory location and a timing indication associated with the time.

20. The system as recited in claim 19, the operations further comprising:
   determining, based at least in part on the first gaze point, a first period of time that the user was looking at the inventory location;
   determining, based at least in part on the second gaze point, a second period of time that the user was looking at the inventory location; and
   determining a third period of time based at least in part on the first period of time and the second period of time,
wherein the timing indication includes the third period of time.

\* \* \* \* \*